United States Patent
Yoon et al.

(10) Patent No.: US 10,768,618 B2
(45) Date of Patent: Sep. 8, 2020

(54) VEHICLE DRIVING CONTROL APPARATUS AND VEHICLE DRIVING METHOD

(71) Applicant: LG Electronics Inc., Seoul (KR)

(72) Inventors: Sangyol Yoon, Seoul (KR); Hansung Lee, Seoul (KR); Junghee Park, Seoul (KR)

(73) Assignee: LG Electronics Inc., Seoul (KR)

(*) Notice: Subject to any disclaimer, the term of this patent is extended or adjusted under 35 U.S.C. 154(b) by 309 days.

(21) Appl. No.: 15/858,152

(22) Filed: Dec. 29, 2017

(65) Prior Publication Data

US 2019/0101915 A1    Apr. 4, 2019

(30) Foreign Application Priority Data

Sep. 29, 2017  (KR) .................. 10-2017-0128051

(51) Int. Cl.
| | | |
|---|---|---|
| G05D 1/00 | (2006.01) | |
| B60W 30/06 | (2006.01) | |
| B60W 50/08 | (2020.01) | |
| B60W 40/09 | (2012.01) | |
| G05D 1/02 | (2020.01) | |
| G07C 5/08 | (2006.01) | |
| B60W 50/00 | (2006.01) | |

(52) U.S. Cl.
CPC .......... *G05D 1/0061* (2013.01); *B60W 30/06* (2013.01); *B60W 40/09* (2013.01); *B60W 50/082* (2013.01); *G05D 1/0088* (2013.01); *G05D 1/0246* (2013.01); *G07C 5/085* (2013.01); *B60W 2050/0089* (2013.01); *B60W 2420/42* (2013.01); *B60W 2510/10* (2013.01); *B60W 2510/186* (2013.01); *B60W 2540/10* (2013.01); *B60W 2540/12* (2013.01); *B60W 2540/18* (2013.01); *B60W 2554/00* (2020.02); *B60W 2555/00* (2020.02); *B60W 2556/50* (2020.02); *G05D 2201/0213* (2013.01)

(58) Field of Classification Search
CPC .... G05D 1/0061; B60W 30/06; B60W 40/09; B60W 50/082
See application file for complete search history.

(56) References Cited

FOREIGN PATENT DOCUMENTS

| DE | 102011107974 | 1/2013 |
| DE | 102013015348 | 4/2014 |
| DE | 102013015349 | 4/2014 |
| EP | 3401191 | 11/2018 |

(Continued)

OTHER PUBLICATIONS

Extended European Search Report in European Appln. No. 18182992.0, dated Feb. 14, 2019, 7 pages.

*Primary Examiner* — Michael D Lang
(74) *Attorney, Agent, or Firm* — Fish & Richardson P.C.

(57) ABSTRACT

A method for operating a vehicle that includes: generating, by at least one processor, a start trigger signal based on first driving situation information; in response to the start trigger signal, performing, by the at least one processor, a storage operation that stores in at least one memory (i) driving manipulation data that is generated based on user input from a user of the vehicle, and (ii) navigation data that is generated corresponding to the driving manipulation data; generating, by the at least one processor, an end trigger signal based on second driving situation information; and in response to the end trigger signal, stopping, by the at least one processor, the storage operation that stores the driving manipulation data and the navigation data is disclosed.

21 Claims, 18 Drawing Sheets

(56) References Cited

FOREIGN PATENT DOCUMENTS

| | | |
|---|---|---|
| JP | H07108849 | 4/1995 |
| KR | 1020170004715 | 1/2017 |
| KR | 1020170057084 | 5/2017 |

1110

VEHICLE DRIVING CONTROL APPARATUS AND VEHICLE DRIVING METHOD

CROSS-REFERENCE TO RELATED APPLICATION

This application claims the benefit of an earlier filing date and right of priority to Korean Patent Application No. 10-2017-0128051, filed on Sep. 29, 2017 in the Korean Intellectual Property Office, the disclosure of which is incorporated herein by reference.

TECHNICAL FIELD

The present disclosure relates to a vehicle driving control apparatus and a vehicle driving method.

BACKGROUND

A vehicle is an apparatus that is moved in a desired direction by a user riding therein. A typical example of the vehicle is an automobile.

Vehicles are typically equipped with various sensors and electronic devices to provide user convenience. In particular, research has been actively conducted on an advanced driver assistance system (ADAS) to provide user convenience in driving. Further, autonomous vehicles have been actively developed.

SUMMARY

In general, one innovative aspect of the subject matter described in this disclosure can be implemented in a method for operating a vehicle including: generating, by at least one processor, a start trigger signal based on first driving situation information; in response to the start trigger signal, performing, by the at least one processor, a storage operation that stores in at least one memory (i) driving manipulation data that is generated based on user input from a user of the vehicle, and (ii) navigation data that is generated corresponding to the driving manipulation data; generating, by the at least one processor, an end trigger signal based on second driving situation information; and in response to the end trigger signal, stopping, by the at least one processor, the storage operation that stores the driving manipulation data and the navigation data.

The foregoing and other implementations can each optionally include one or more of the following features, alone or in combination. In particular, one implementation includes all the following features in combination. The method further includes: controlling, by the at least one processor, the vehicle based on the driving manipulation data and the navigation data. The first driving situation information includes information about an object outside the vehicle that is generated by an object detection device, and wherein generating the start trigger signal based on the first driving situation information includes generating the start trigger signal based on the information about the object outside the vehicle. The object detection device includes one or more cameras, and wherein generating the start trigger signal based on the information about the object outside the vehicle includes: generating the start trigger signal based on information about the object being detected in one or more images detected by the one or more cameras. Generating the start trigger signal based on the first driving situation information includes: generating the start trigger signal based on a signal for switching the vehicle to a manual driving mode that is generated by a user interface device. Generating the start trigger signal based on the first driving situation information includes: generating the start trigger signal based on location information for the vehicle generated by a location information unit. Generating the start trigger signal based on the first driving situation information includes: in a state in which the location information indicates that the vehicle is located at a first location: generating the start trigger signal based on stored cumulative information indicating that a number of times that the vehicle has been previously maneuvered to the first location by a user input-based operation is greater than a threshold number. Generating the start trigger signal based on the first driving situation information includes: in a state in which the location information indicates that the vehicle is located in a first section of a route: generating the start trigger signal based on stored cumulative information indicating that a number of times that the vehicle has been previously maneuvered through the first section of the route by a user input-based operation is greater than a threshold number. Generating the start trigger signal based on the first driving situation information includes: generating the start trigger signal based on a turn-on signal for an advanced driver assistance system (ADAS) that indicates an activation of the ADAS. Generating the end trigger signal based on the second driving situation information includes: generating the end trigger signal based on information about an object outside the vehicle that is generated by an object detection device. The object detection device includes one or more cameras, and wherein generating the end trigger signal based on the information about the object outside the vehicle that is generated by the object detection device includes: generating the end trigger signal based on information about the object detected in one or more images acquired by the one or more cameras. Generating the end trigger signal based on the second driving situation information includes: generating the end trigger signal based on a signal for switching the vehicle to an autonomous driving mode generated by a user interface device. Generating the end trigger signal based on the second driving situation information includes: generating the end trigger signal based on location information for the vehicle generated by a location information unit. Generating the end trigger signal based on the second driving situation information includes: generating the end trigger signal based on a turn-off signal for an advanced driver assistance system (ADAS) that indicates a deactivation of the ADAS. Generating the end trigger includes: generating the end trigger signal based on vehicle state information generated by a sensing unit. The vehicle state information includes at least one of: position information of a shift lever of the vehicle, turn-off information of the vehicle, folding information of a side mirror of the vehicle, opening information of a door of the vehicle, or operation information of a parking brake of the vehicle. Performing the storage operation that stores the driving manipulation data and the navigation data includes: in a state in which the vehicle is operated based on a user input in a first area, storing, by the at least one processor and in the at least one memory, (i) first driving manipulation data that is generated based on the user input, and (ii) first navigation data that is generated based on the first driving manipulation data; and in a state in which the vehicle is operated based on a user input in a second area that is adjacent to the first area, storing, by the at least one processor and in the at least one memory, (i) second driving manipulation data that is generated based on the user input, and (ii) second navigation data that is generated based on the second driving manipulation data. The method further includes: combining, by the at least one processor, the first driving manipulation data and the second driving manipulation data to generate the driving manipulation data for an area that includes the first area and the second area; and combining, by the at least one processor, the first navigation data and the second navigation data to generate the navigation data for the area that includes the first area and the second area. The method further includes: determining whether the vehicle is located in the area that includes the first area and the second area, based on a determination that the vehicle is located in the area that includes the first area and the second area, controlling, by the at least one processor, the vehicle using the driving manipulation data and the navigation data for the area that includes the first area and the second area. The first driving situation information includes information about a situation of the vehicle before starting the storage operation of the driving manipulation data and the navigation data, and the second driving situation information includes information about a situation of the vehicle during the storage operation of the driving manipulation data and the navigation data.

In general, another innovative aspect of the subject matter described in this disclosure can be implemented in an apparatus for operating a vehicle, the apparatus including: at least one memory; and at least one processor that is configured to: generate a start trigger signal based on first driving situation information; in response to the start trigger signal, perform a storage operation that stores, in the at least one memory, (i) driving manipulation data that is generated based on user input from a user of the vehicle, and (ii) navigation data that is generated corresponding to the driving manipulation data; and generate an end trigger signal based on second driving situation information; and in response to the end trigger signal, stop the storage operation that stores the driving manipulation data and the navigation data.

In general, another innovative aspect of the subject matter described in this disclosure can be implemented in a method for operating a vehicle, the method including: performing a storage operation that temporarily stores, by at least one processor and in at least one memory, (i) driving manipulation data that is generated based on user input from a user of the vehicle, and (ii) navigation data that is generated based on the driving manipulation data; generating, by the at least one processor, an end trigger signal based on driving situation information of the vehicle; and in response to the end trigger signal, completing, by the at least one processor, the storage operation to temporarily store at least a portion of the driving manipulation data and at least a portion of the navigation data that were accumulated during a first period of time immediately preceding the generating of the end trigger signal, wherein the first period of time is determined based on the driving situation information.

The subject matter described in this disclosure can be implemented in particular examples so as to realize one or more of the following advantages. The method and the apparatus in this disclosure store data based on a start trigger signal and an end trigger signal. Thus, only necessary data can be stored and efficient data management can be performed. This improves the efficiency of a memory storing the data In addition, since the start trigger signal and the end trigger signal are generated according to the driving situation information, the necessary data may be stored without user input, enabling efficient data management.

Moreover, since the operation of the vehicle is controlled based on the stored data, the operation control based on the sensing data may be complemented.

The method described in this disclosure acquires information from a mobile terminal of a pedestrian and use the information for control a vehicle. In particular, the method determines necessary information for controlling a vehicle based on a location of the mobile device. As a result, the method can only use meaningful and necessary information to control a vehicle, reducing computing power of the vehicle. In addition, the method enables safe and efficient driving for the vehicle using the information acquired from the mobile device of the pedestrian.

The details of one or more examples of the subject matter described in this disclosure are set forth in the accompanying drawings and the description below. Other potential features, aspects, and advantages of the subject matter will become apparent from the description, the drawings, and the claim.

DETAILED DESCRIPTION

In some implementations, a vehicle may utilize machine learning to facilitate one or more autonomous operations. For example, an autonomous vehicle may utilize one or more sensors and/or receive information from other sources to determine information about its environment, and use machine learning to dynamically adapt to its environment and improve autonomous driving.

In some scenarios, however, information that is detected by a vehicle's sensors and/or received from other sources may include information that is not relevant or not useful for machine learning. As such, machine learning may face an excessive amount of data, of which only necessary data may actually be useful.

Implementations disclosed herein enable a vehicle to selectively and adaptively control the collection of different types of data based on information regarding the vehicle surroundings. As such, in some scenarios, implementations disclosed herein may improve efficiency and reduce data processing loads in machine learning applications.

The term "vehicle" as used in this disclosure may include any suitable motorized vehicle, such as an automobile and a motorcycle. Hereinafter, description will be given based on an example of a vehicle as an automobile.

The vehicle described in this disclosure may include a vehicle equipped with an internal combustion engine as a power source, a hybrid vehicle equipped with both an engine and an electric motor as a power source, and an electric vehicle equipped with an electric motor as a power source.

In the description below, the left side of the vehicle means the left side with respect to the travel direction of the vehicle and the right side of the vehicle means the right side with respect to the travel direction of the vehicle.

Figure 1:
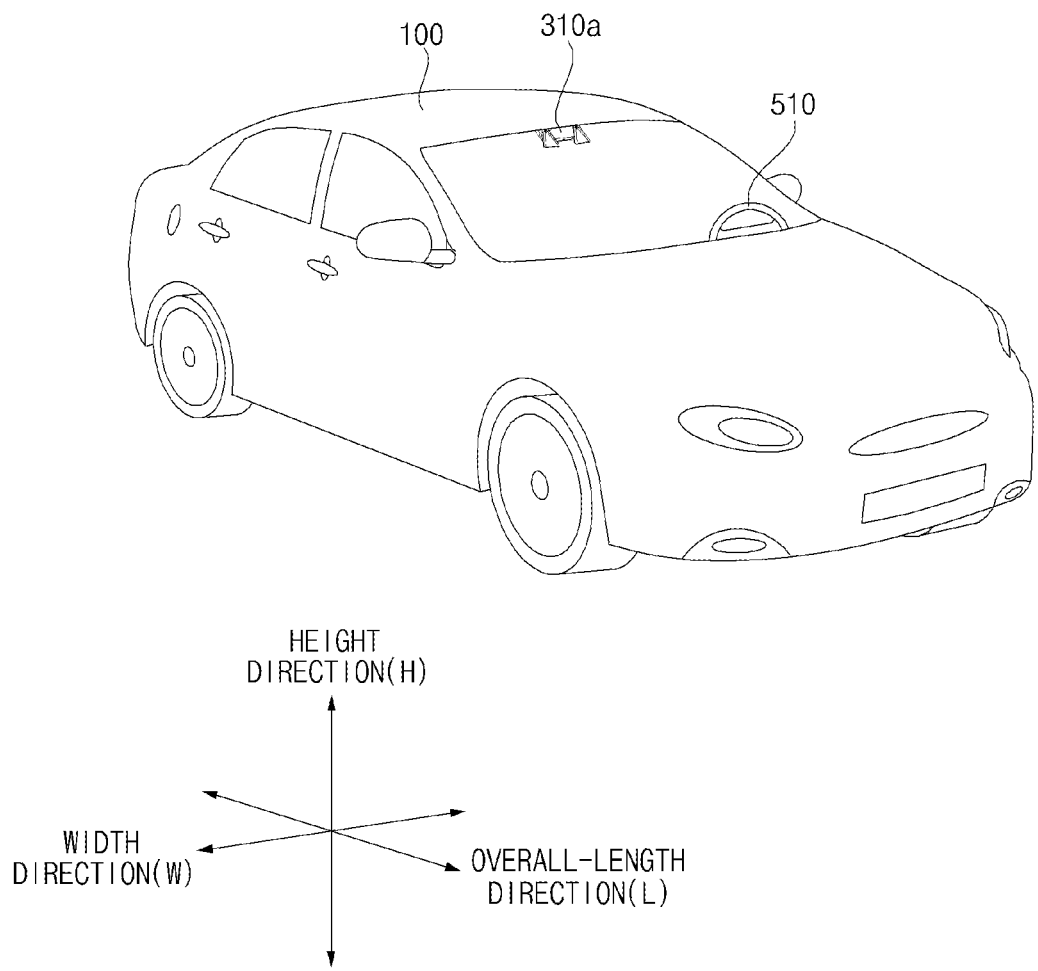
FIG. 1 is a diagram illustrating an example exterior of a vehicle.
Figure 2:
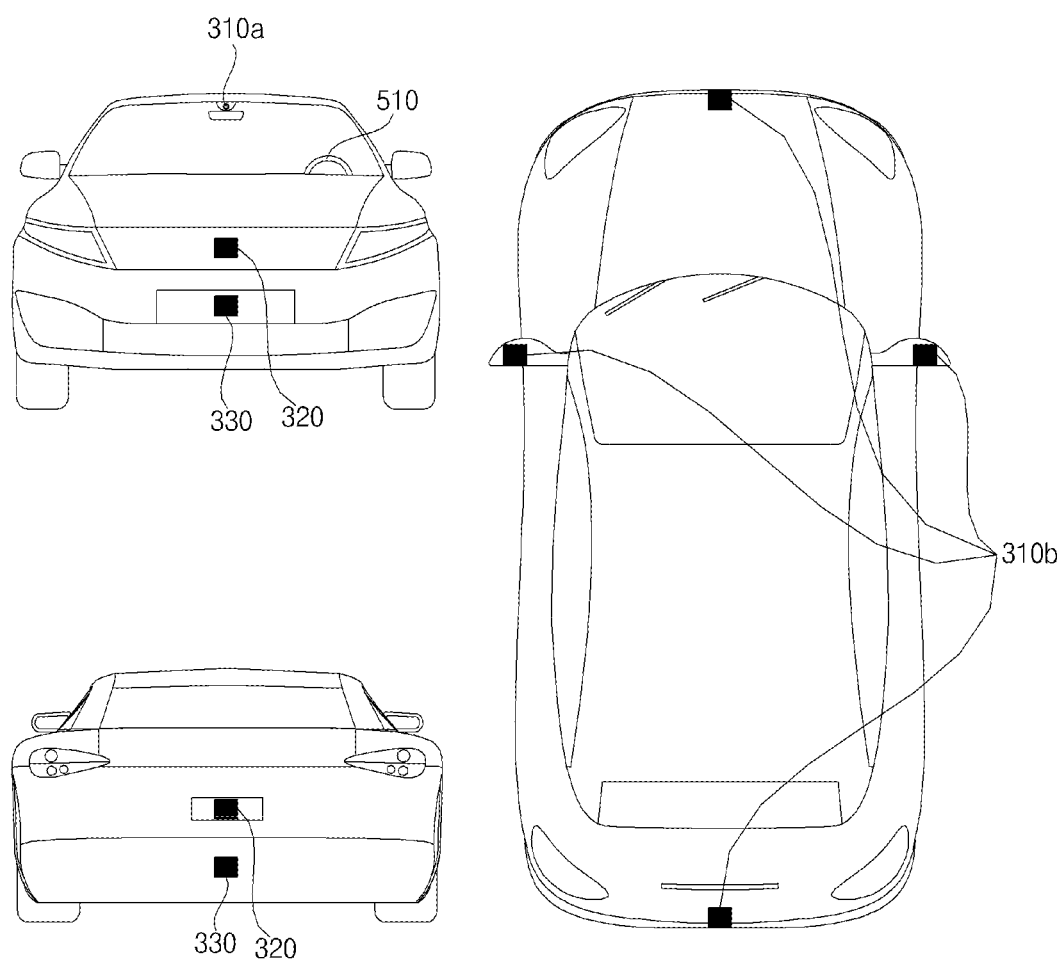
FIG. 2 is a diagram illustrating an example exterior of a vehicle in various angles.
Figure 3:
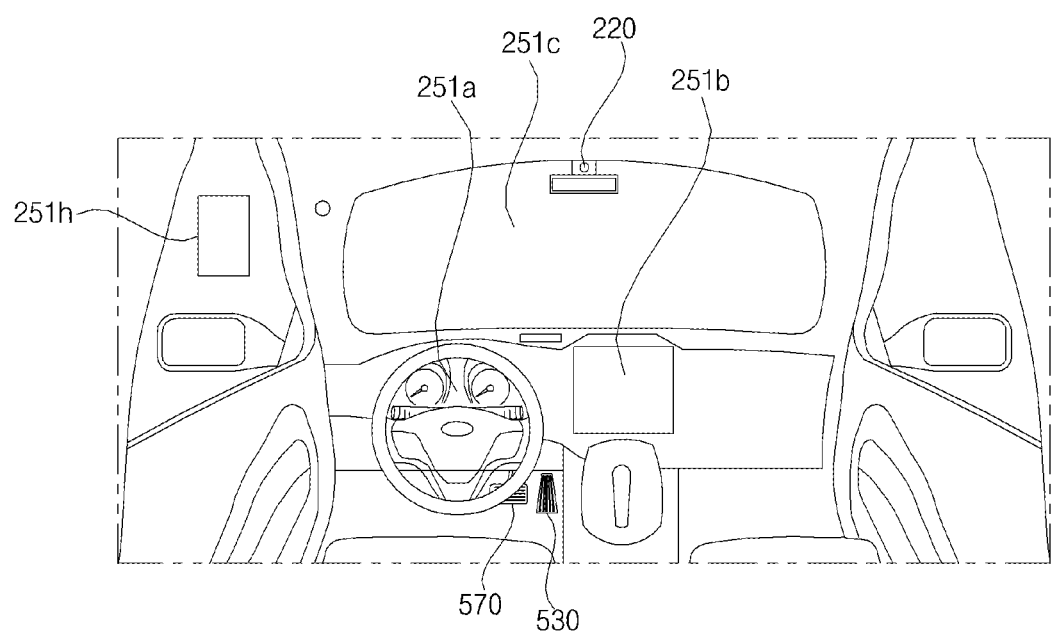
FIGS. 3 and 4 are diagrams illustrating an example interior of a vehicle.
Figure 4:
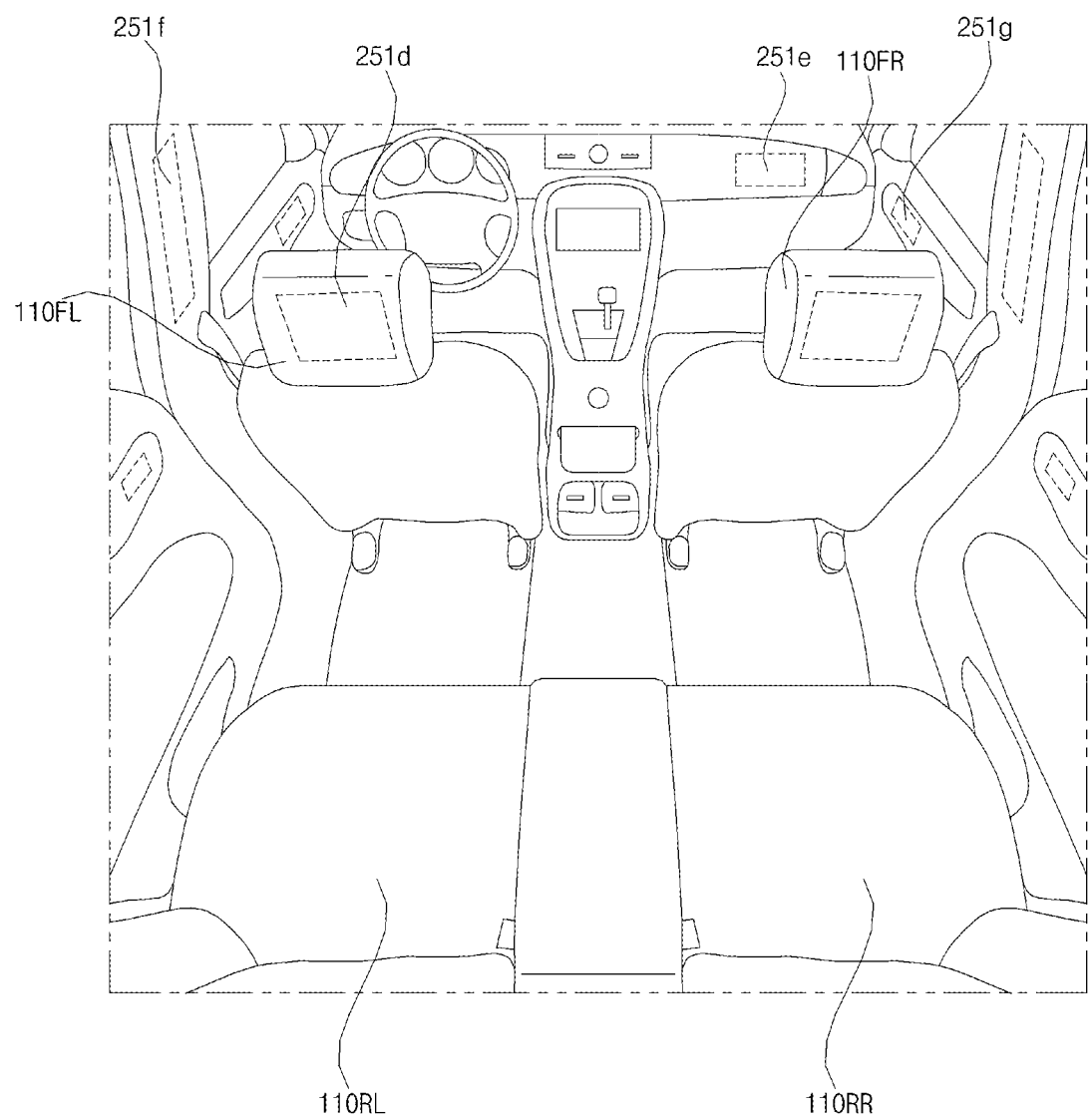
Figure 5:
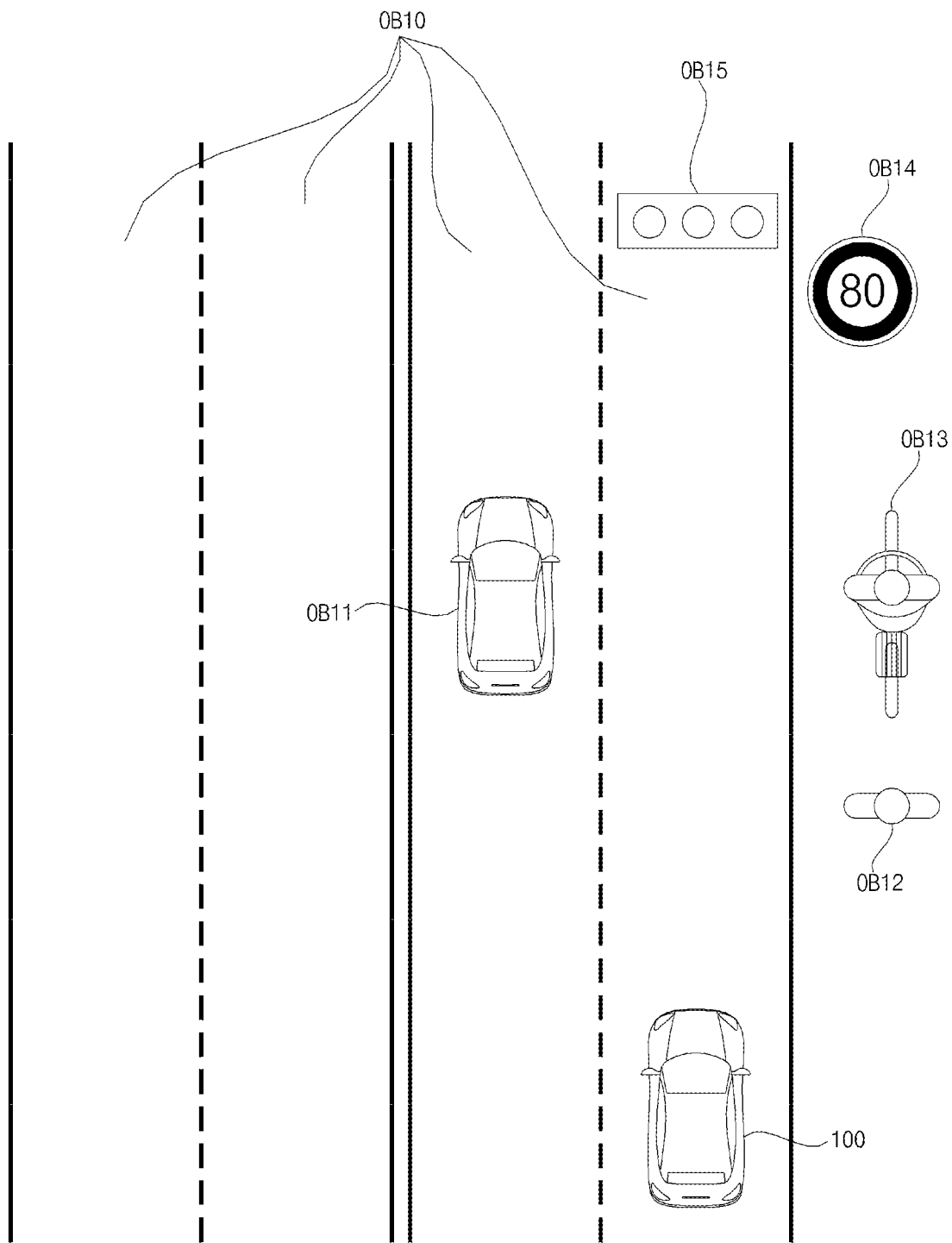
FIGS. 5 and 6 are diagrams illustrating example objects.
Figure 6:
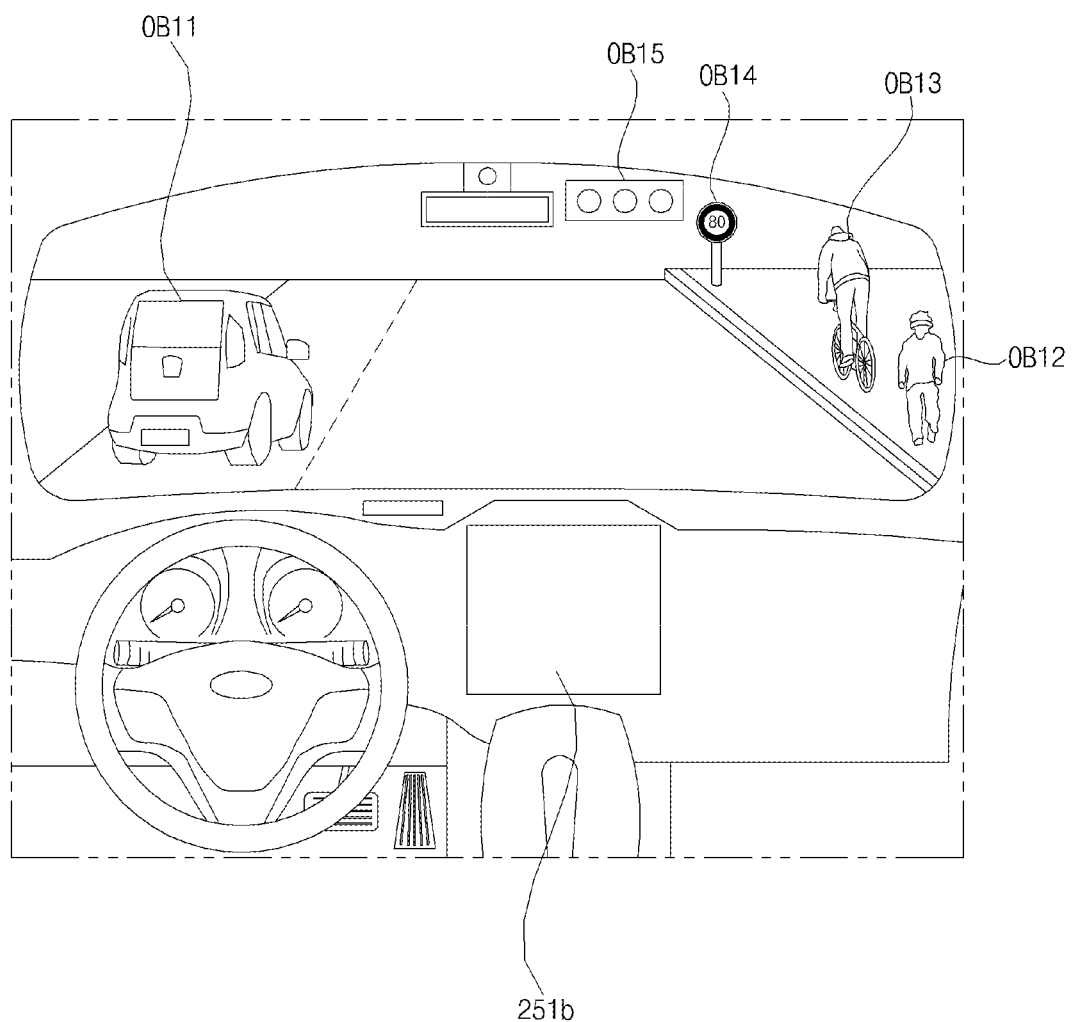
Figure 7:
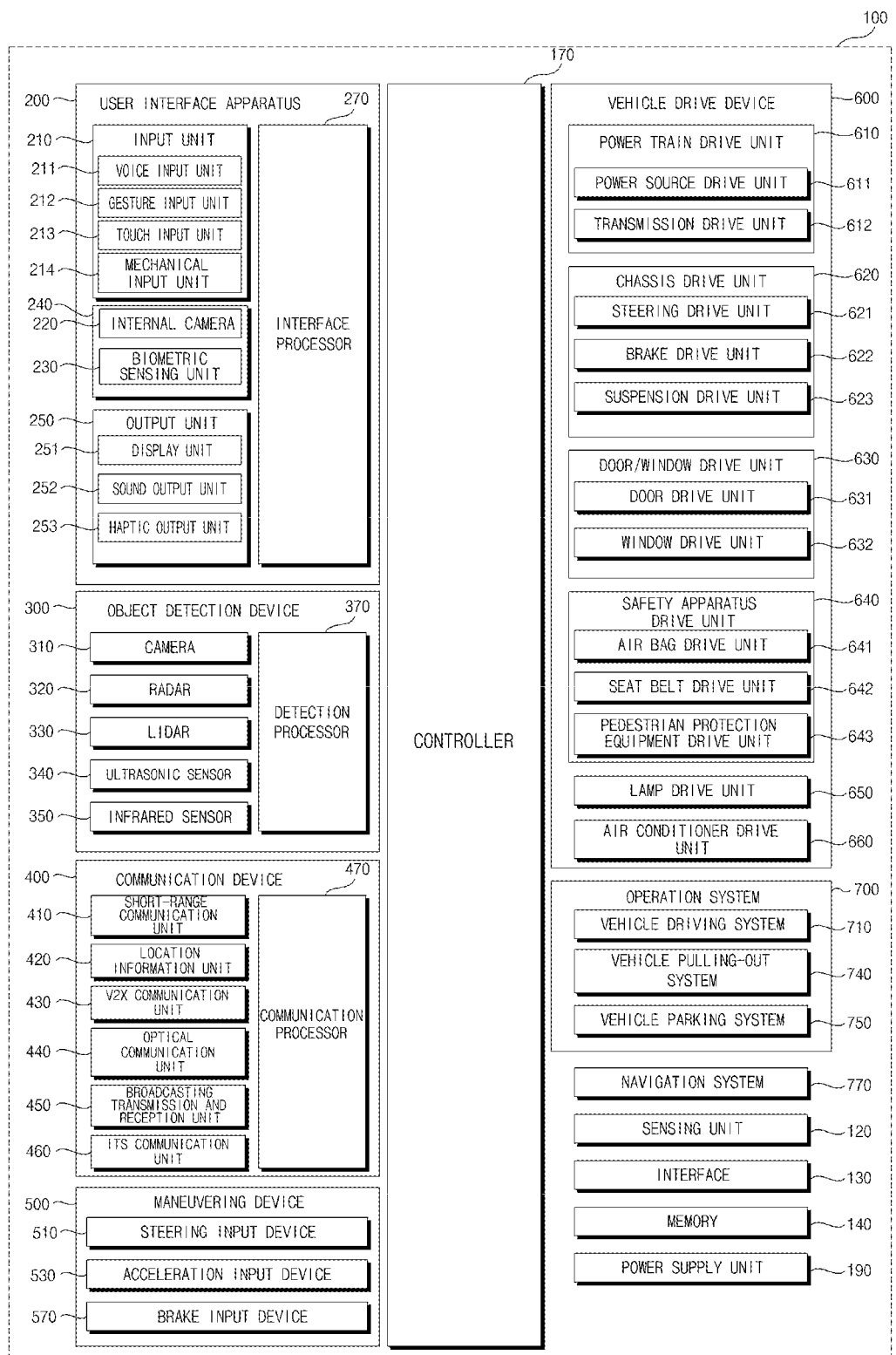
FIG. 7 is a diagram illustrating an example vehicle.

FIG. 1 illustrates an example exterior of a vehicle. FIG. 2 illustrates an example exterior of a vehicle in various angles. FIGS. 3 and 4 illustrate an example interior of a vehicle. FIGS. 5 and 6 illustrate example objects. FIG. 7 illustrates an example vehicle.

Referring to FIGS. 1 to 7, a vehicle 100 may include wheels rotated by a power source, and a steering input device 510 for controlling a travel direction of the vehicle 100.

The vehicle 100 may be an autonomous vehicle.

The vehicle 100 may switch to an autonomous driving mode or a manual mode according to a user input.

For example, the vehicle 100 may switch from the manual mode to the autonomous driving mode or from the autonomous driving mode to the manual mode, based on a user input received through a User Interface (UI) device 200.

The vehicle 100 may switch to the autonomous driving mode or the manual mode based on driving situation information. In some implementations, driving situation information is information about a situation in which the vehicle is placed.

For example, the driving situation information may include at least one of information about objects outside the vehicle, navigation information, or vehicle state information.

For example, the vehicle 100 may switch from the manual mode to the autonomous driving mode or from the autonomous driving mode to the manual mode, based on the driving situation information generated from an object detection device 300.

For example, the vehicle 100 may switch from the manual mode to the autonomous driving mode or from the autonomous driving mode to the manual mode, based on the driving situation information received from a communication device 400.

The vehicle 100 may switch from the manual mode to the autonomous driving mode or from the autonomous driving mode to the manual mode, based on information, data, or a signal provided by an external device.

When the vehicle 100 travels in the autonomous driving mode, the autonomous vehicle 100 may be operated based on an operation system 700.

For example, the autonomous vehicle 100 may travel based on information, data, or signals generated from a driving system 710, a park-out system 740, and a park-in system.

If the vehicle 100 travels in the manual mode, the autonomous vehicle 100 may receive a user input for driving through a driving manipulation device 500. The vehicle 100 may be operated based on the user input received through the driving manipulation device 500.

The overall length refers to the length of the vehicle 100 from the front to back of the vehicle 100, the width refers to the width of the vehicle 100, and the height refers to the distance from the bottom of wheels to the roof of the vehicle. In the description below, the overall-length direction L may indicate a direction in which measurement of overall length of the vehicle 100 is performed, the width direction W may indicate a direction in which measurement of width of the vehicle 100 is performed, and the height direction H may indicate a direction in which measurement of height of the vehicle 100 is performed.

As illustrated in FIG. 7, the vehicle 100 may include the UI device 200, the object detection device 300, the communication device 400, the driving manipulation device 500, a vehicle driving device 600, the operation system 700, a navigation system 770, a sensing unit 120, an interface unit 130, a memory 140, a controller 170, and a power supply 190.

In some implementations, the vehicle 100 may further include a new component in addition to the components described in this disclosure, or may not include a part of the described components.

The UI device 200 is used to enable the vehicle 100 to communicate with a user. The UI device 200 may receive a user input, and provide information generated from the vehicle 100 to the user. The vehicle 100 may implement UIs or User Experience (UX) through the UI device 200.

The UI device 200 may include an input unit 210, an internal camera 220, a biometric sensing unit 230, an output unit 250, and a processor 270.

In some implementations, the UI device 200 may further include a new component in addition to components described below, or may not include a part of the described components.

The input unit 210 is intended to receive information from a user. Data collected by the input unit 210 may be analyzed by the processor 270 and processed by a control command from the user.

The input unit 210 may be disposed inside the vehicle 100. For example, the input unit 210 may be disposed in an area of a steering wheel, an area of an instrument panel, an area of a seat, an area of a pillar, an area of a door, an area of a center console, an area of a head lining, an area of a sun visor, an area of a windshield, an area of a window, or the like.

The input unit 210 may include a voice input unit 211, a gesture input unit 212, a touch input unit 213, and a mechanical input unit 214.

The voice input unit 211 may convert a voice input of the user to an electrical signal. The electrical signal may be provided to the processor 270 or the controller 170.

The voice input unit 211 may include one or more microphones.

The gesture input unit 212 may convert a gesture input of the user to an electrical signal. The electrical signal may be provided to the processor 270 or the controller 170.

The gesture input unit 212 may include at least one of an infrared (IR) sensor and an image sensor, for sensing a gesture input of the user.

In some implementations, the gesture input unit 212 may sense a three-dimensional (3D) gesture input of the user. For this purpose, the gesture input unit 212 may include a light output unit for emitting a plurality of IR rays or a plurality of image sensors.

The gesture input unit 212 may sense a 3D gesture input of the user by Time of Flight (ToF), structured light, or disparity.

The touch input unit 213 may convert a touch input of the user to an electrical signal. The electrical signal may be provided to the processor 270 or the controller 170.

The touch input unit 213 may include a touch sensor for sensing a touch input of the user.

In some implementations, a touch screen may be configured by integrating the touch input unit 213 with a display unit 251. The touch screen may provide both an input interface and an output interface between the vehicle 100 and the user.

The mechanical input unit 214 may include at least one of a button, a dome switch, a jog wheel, or a jog switch. An electrical signal generated by the mechanical input unit 214 may be provided to the processor 270 or the controller 170.

The mechanical input unit 214 may be disposed on the steering wheel, the center fascia, the center console, the cockpit module, a door, or the like.

The processor 270 initiates the learning mode of the vehicle 100 in response to user input to at least one of the voice input unit 211, the gesture input unit 212, the touch input unit 213, or the mechanical input unit 214. In the learning mode, the vehicle 100 may perform learning of a travel path of the vehicle 100 and learning of the surrounding environment. The learning mode will be described in detail later in a section related to the object detection device 300 and the operation system 700.

The internal camera 220 may acquire a vehicle interior image. The processor 270 may sense a state of a user based on the vehicle interior image. The processor 270 may acquire information about the gaze of a user in the vehicle interior image. The processor 270 may sense the user's gesture in the vehicle interior image.

The biometric sensing unit 230 may acquire biometric information about a user. The biometric sensing unit 230 may include a sensor for acquiring biometric information about a user, and acquire information about a fingerprint, heart beats, and the like of the user, using the sensor. The biometric information may be used for user authentication.

The output unit 250 is provided to generate a visual output, an acoustic output, or a haptic output.

The output unit 250 may include at least one of the display unit 251, an audio output unit 252, or a haptic output unit 253.

The display unit 251 may display graphic objects corresponding to various kinds of information.

The display unit 251 may include at least one of a liquid crystal display (LCD), a thin film transistor-liquid crystal display (TFT LCD), an organic light-emitting diode (OLED) display, a flexible display, a 3D display, or an e-ink display.

The display unit 251 may form a layered structure together with the touch input unit 213 or be integrated with the touch input unit 213, thereby implementing a touchscreen.

The display unit 251 may be implemented as a head up display (HUD). In this case, the display unit 251 may be provided with a projection module, and output information by an image projected onto the windshield or a window.

The display unit 251 may include a transparent display. The transparent display may be attached to the windshield or a window.

The transparent display may display a specific screen with a specific transparency. To have a transparency, the transparent display may include at least one of a transparent Thin Film Electroluminescent (TFFL) display, a transparent OLED display, a transparent LCD, a transmissive transparent display, or a transparent LED display. The transparency of the transparent display is adjustable.

The UI device 200 may include a plurality of display units 251a to 251g.

The display unit 251 may be disposed in an area of the steering wheel, an area 251a, 251b, 251e of the instrument panel, an area 251d of a seat, an area 251f of a pillar, an area 251g of a door, an area of the center console, an area of a head lining, or an area of a sun visor, or may be implemented in an area 251c of the windshield, and an area 251h of a window.

The audio output unit 252 converts an electrical signal received from the processor 270 or the controller 170 to an audio signal, and outputs the audio signal. To this end, the audio output unit 252 may include one or more speakers.

The haptic output unit 253 generates a haptic output. For example, the haptic output unit 253 may vibrate the steering wheel, a seat belt, a seat 110FL, 110FR, 110RL, or 110RR, such that a user may perceive the output.

The processor 270 may control overall operation of the respective units of the UI device 200.

In some implementations, the UI device 200 may include a plurality of processors 270 or no processor 270.

If the UI device 200 does not include any processor 270, the UI device 200 may operate under control of a processor of another device in the vehicle 100, or under control of the controller 170.

The UI device 200 may be referred to as a vehicle display device.

The UI device 200 may operate under control of the controller 170.

The object detection device 300 is used to detect an object outside the vehicle 100. The object detection device 300 may generate object information based on sensing data.

The object information may include information indicating presence or absence of an object, information about the location of an object, information indicating the distance between the vehicle 100 and the object, and information about a relative speed of the vehicle 100 with respect to the object.

The object may be any of various objects related to driving of the vehicle 100.

Referring to FIGS. 5 and 6, the object O may include a lane OB10, another vehicle OB11, a pedestrian OB12, a two-wheeled vehicle OB13, a traffic signal OB14 and OB15, light, a road, a structure, a speed bump, a geographical feature, and an animal.

The lane OB10 may include a driving lane, a lane next to the driving lane, and a lane in which a vehicle is driving in the opposite direction. The lane OB10 may include left and right lines that define each of the lanes. The lane may include an intersection.

The other vehicle OB11 may be a vehicle traveling in the vicinity of the vehicle 100. The other vehicle OB11 may be located inside a predetermined distance from the vehicle 100. For example, the other vehicle OB11 may precede or follow the vehicle 100.

The pedestrian OB12 may be a person located around the vehicle 100. The pedestrian OB12 may be a person located inside a predetermined distance from the vehicle 100. For example, the pedestrian OB12 may be a person on a sidewalk or a roadway.

The two-wheeled vehicle OB13 may refer to a transportation apparatus moving on two wheels, located around the vehicle 100. The two-wheeled vehicle OB13 may be a transportation apparatus having two wheels, located inside a predetermined distance from the vehicle 100. For example, the two-wheeled vehicle OB13 may be a motorcycle or bicycle on a sidewalk or a roadway.

The traffic signal may include a traffic light OB15, a traffic sign OB14, and a symbol or text drawn or written on a road surface.

The light may be light generated from a lamp of another vehicle. The light may be generated from a street lamp. The light may be sunlight.

The road may include a road surface, a curve, and a slope such as an uphill or downhill road.

The structure may be an object located near a road and fixed on the ground. For example, the structure may be any of a street lamp, a street tree, a building, a utility pole, a signal lamp, a bridge, a kerb, and a wall.

The geographical feature may include a mountain and a hill.

In some implementations, objects may be classified into mobile objects and stationary objects. For example, the mobile objects may include another vehicle and a pedestrian. For example, the stationary objects may include a traffic signal, a road, a structure, another stationary vehicle, and a stationary pedestrian.

The object detection device 300 may include a camera 310, a Radio Detection and Ranging (RADAR) 320, a Light Detection and Ranging (LiDAR) 330, an ultrasonic sensor 340, an IR sensor 350, and a processor 370.

In some implementations, the object detection device 300 may further include a new component in addition to components described below or may not include a part of the described components.

To acquire a vehicle exterior image, the camera 310 may be disposed at an appropriate position on the exterior of the vehicle 100. The camera 310 may be a mono camera, a stereo camera 310*a*, Around View Monitoring (AVM) cameras 310*b*, or a 360-degree camera.

The camera 310 may acquire information about the location of an object, information about a distance to the object, or information about a relative speed with respect to the object, using various image processing algorithms.

For example, the camera 310 may acquire information about a distance to an object and information about a relative speed with respect to the object in an acquired image, based on a variation in size of the object over time.

For example, the camera 310 may acquire information about a distance to an object and information about a relative speed with respect to the object through a pin hole model, road surface profiling, or the like.

For example, the camera 310 may acquire information about a distance to an object and information about a relative speed with respect to the object based on disparity information in a stereo image acquired by the stereo camera 310*a*.

For example, to acquire an image of the front view of the vehicle 100, the camera 310 may be disposed in the vicinity of a front windshield inside the vehicle 100. Alternatively, the camera 310 may be disposed around a front bumper or a radiator grille.

For example, to acquire an image of what lies behind the vehicle 100, the camera 310 may be disposed in the vicinity of a rear glass inside the vehicle 100. Or the camera 310 may be disposed around a rear bumper, a trunk, or a tail gate.

For example, to acquire an image of what lies on a side of the vehicle 100, the camera 310 may be disposed in the vicinity of at least one of side windows inside the vehicle 100. Alternatively, the camera 310 may be disposed around a side view mirror, a fender, or a door.

The camera 310 may provide an acquired image to the processor 370.

The RADAR 320 may include an electromagnetic wave transmitter and an electromagnetic wave receiver. The RADAR 320 may be implemented by pulse RADAR or continuous wave RADAR. The RADAR 320 may be implemented by Frequency Modulated Continuous Wave (FMCW) or Frequency Shift Keying (FSK) as a pulse RADAR scheme according to a signal waveform.

The RADAR 320 may detect an object in TOF or phase shifting by electromagnetic waves, and determine the location, distance, and relative speed of the detected object.

The RADAR 320 may be disposed at an appropriate position on the exterior of the vehicle 100 in order to sense an object ahead of, behind, or on a side of the vehicle 100.

The LiDAR 330 may include a laser transmitter and a laser receiver. The LiDAR 330 may be implemented in TOF or phase shifting.

The LiDAR 330 may be implemented in a driven or non-driven manner.

If the LiDAR 330 is implemented in the driven manner, the LiDAR 330 may be rotated by a motor and detect objects around the vehicle 100.

If the LiDAR 330 is implemented in a non-driven manner, the LiDAR 330 may detect an object within a predetermined range from the vehicle 100 by optical steering. The vehicle 100 may include a plurality of non-driven LiDARs 330.

The LiDAR 330 may detect an object in TOF or phase shifting by laser light, and determine the location, distance, and relative speed of the detected object.

The LiDAR 330 may be disposed at an appropriate position on the exterior of the vehicle 100 in order to sense an object ahead of, behind, or on a side of the vehicle 100.

The ultrasonic sensor 340 may include an ultrasonic wave transmitter and an ultrasonic wave receiver. The ultrasonic sensor 340 may detect an object by ultrasonic waves, and determine the location, distance, and relative speed of the detected object.

The ultrasonic sensor 340 may be disposed at an appropriate position on the exterior of the vehicle 100 in order to sense an object ahead of, behind, or on a side of the vehicle 100.

The IR sensor 350 may include an IR transmitter and an IR receiver. The IR sensor 350 may detect an object by IR light, and determine the location, distance, and relative speed of the detected object.

The IR sensor 350 may be disposed at an appropriate position on the exterior of the vehicle 100 in order to sense an object ahead of, behind, or on a side of the vehicle 100.

The processor 370 may provide overall control to each unit of the object detection device 300.

The processor 370 may detect or classify an object by comparing data sensed by the camera 310, the RADAR 320, the LiDAR 330, the ultrasonic sensor 340, and the IR sensor 350 with pre-stored data.

The processor 370 may detect an object and track the detected object, based on an acquired image. The processor 370 may calculate a distance to the object, a relative speed with respect to the object, and so on by an image processing algorithm.

For example, the processor 370 may acquire information about a distance to an object and information about a relative speed with respect to the object from an acquired image, based on a variation in size of the object over time.

For example, the processor 370 may acquire information about a distance to an object and information about a relative speed with respect to the object from an image acquired from the stereo camera 310*a*.

For example, the processor 370 may acquire information about a distance to an object and information about a relative speed with respect to the object from an image acquired from the stereo camera 310*a*, based on disparity information.

The processor 370 may detect an object and track the detected object based on electromagnetic waves which are transmitted, are reflected from an object, and then return. The processor 370 may calculate a distance to the object and a relative speed with respect to the object, based on the electromagnetic waves.

The processor 370 may detect an object and track the detected object based on laser light which is transmitted, is reflected from an object, and then returns. The sensing processor 370 may calculate a distance to the object and a relative speed with respect to the object, based on the laser light.

The processor 370 may detect an object and track the detected object based on ultrasonic waves which are transmitted, are reflected from an object, and then return. The processor 370 may calculate a distance to the object and a relative speed with respect to the object, based on the ultrasonic waves.

The processor 370 may detect an object and track the detected object based on IR light which is transmitted, is reflected from an object, and then returns. The processor 370 may calculate a distance to the object and a relative speed with respect to the object, based on the IR light.

As described above, when the learning mode of the vehicle 100 is initiated in response to a user input to the input unit 210, the processor 370 may store, in the memory 140, the data sensed by the camera 310, the RADAR 320, the LiDAR 330, the ultrasonic sensor 340, and the IR sensor 350.

The respective steps of the learning mode based on analysis of the stored data and the operating mode following the learning mode will be described in detail later in a section related to the operation system 700.

In some implementations, the object detection device 300 may include a plurality of processors 370 or no processor 370. For example, the camera 310, the RADAR 320, the LiDAR 330, the ultrasonic sensor 340, and the IR sensor 350 may include individual processors.

If the object detection device 300 includes no processor 370, the object detection device 300 may operate under control of a processor of a device in the vehicle 100 or under control of the controller 170.

The object detection device 300 may operate under control of the controller 170.

The communication device 400 is used to communicate with an external device. The external device may be another vehicle, a mobile terminal, or a server.

The communication device 400 may include at least one of a transmit antenna and a receive antenna, for communication, and a Radio Frequency (RF) circuit and device, for implementing various communication protocols.

The communication device 400 may include a short-range communication unit 410, a location information unit 420, a vehicle-to-everything (V2X) communication unit 430, an optical communication unit 440, a broadcasting transceiver unit 450, an intelligent transport system (ITS) communication unit 460, and a processor 470.

In some implementations, the communication device 400 may further include a new component in addition to components described below, or may not include a part of the described components.

The short-range communication module 410 is a unit for conducting short-range communication. The short-range communication module 410 may support short-range communication, using at least one of Bluetooth™, Radio Frequency Identification (RFID), Infrared Data Association (IrDA), Ultra Wideband (UWB), ZigBee, Near Field Communication (NFC), Wireless Fidelity (Wi-Fi), Wi-Fi Direct, or Wireless Universal Serial Bus (Wireless USB).

The short-range communication unit 410 may conduct short-range communication between the vehicle 100 and at least one external device by establishing a wireless area network.

The location information unit 420 is a unit configured to acquire information about a location of the vehicle 100. The location information unit 420 may include at least one of a GPS module or a Differential Global Positioning System (DGPS) module.

The V2X communication unit 430 is a unit used for wireless communication with a server (by vehicle-to-infrastructure (V2I)), another vehicle (by vehicle-to-vehicle (V2V)), or a pedestrian (by vehicle-to-pedestrian (V2P)). The V2X communication unit 430 may include an RF circuit capable of implementing a V2I protocol, a V2V protocol, and a V2P protocol.

The optical communication unit 440 is a unit used to communicate with an external device by light. The optical communication unit 440 may include an optical transmitter for converting an electrical signal to an optical signal and emitting the optical signal to the outside, and an optical receiver for converting a received optical signal to an electrical signal.

In some implementations, the optical transmitter may be integrated with a lamp included in the vehicle 100.

The broadcasting transceiver unit 450 is a unit used to receive a broadcast signal from an external broadcasting management server or transmit a broadcast signal to the broadcasting management server, on a broadcast channel. The broadcast channel may include a satellite channel and a terrestrial channel. The broadcast signal may include a TV broadcast signal, a radio broadcast signal, and a data broadcast signal.

The ITS communication unit 460 may exchange information, data, or signals with a traffic system. The ITS communication unit 460 may provide acquired information and data to the traffic system. The ITS communication unit 460 may receive information, data, or a signal from the traffic system. For example, the ITS communication unit 460 may receive traffic information from the traffic system and provide the received traffic information to the controller 170. For example, the ITS communication unit 460 may receive a control signal from the traffic system, and provide the received control signal to the controller 170 or a processor in the vehicle 100.

The processor 470 may control overall operation of the respective units of the communication device 400.

In some implementations, the communication device 400 may include a plurality of processors 470 or no processor 470.

If the communication device 400 does not include any processor 470, the communication device 400 may operate under control of a processor of another device in the vehicle 100 or under control of the controller 170.

The communication device 400 may be configured along with the UI device 200, as a vehicle multimedia device. In this case, the vehicle multimedia device may be referred to as a telematics device or an Audio Video Navigation (AVN) device.

The communication device 400 may operate under control of the controller 170.

The driving manipulation device 500 is used to receive a user command for driving the vehicle 100.

In the manual mode, the vehicle 100 may travel based on a signal provided by the driving manipulation device 500.

The driving manipulation device 500 may include the steering input device 510, an acceleration input device 530, and a brake input device 570.

The steering input device 510 may receive a travel direction input for the vehicle 100 from a user. The steering input device 510 preferably takes the form of a wheel to rotate to provide a steering input. According to an implementation, the steering input device 510 may be configured as a touch screen, a touchpad, or a button.

The acceleration input device 530 may receive an input for acceleration of the vehicle 100 from the user. The brake input device 570 may receive an input for deceleration of the vehicle 100 from the user. The acceleration input device 530 and the brake input device 570 are preferably formed into pedals. In some implementations, the acceleration input device 530 or the brake input device 570 may be configured as a touch screen, a touchpad, or a button.

The driving manipulation device 500 may operate under control of the controller 170.

The vehicle driving device 600 is used to electrically control operations of various devices of the vehicle 100.

The vehicle driving device 600 may include at least one of a power train drive unit 610, a chassis drive unit 620, a door/window drive unit 630, a safety apparatus drive unit 640, a lamp drive unit 650, and an air conditioner drive unit 660.

In some implementations, the vehicle driving device 600 may further include a new component in addition to components described below or may not include a part of the components.

The vehicle driving device 600 may include a processor. Each the units of the vehicle driving device 600 may individually include a processor.

The power train drive unit 610 may control operation of a power train device.

The power train drive unit 610 may include a power source drive unit 611 and a transmission drive unit 612.

The power source drive unit 611 may control a power source of the vehicle 100.

For example, if the power source is a fossil fuel-based engine, the power source drive unit 611 may perform electronic control on the engine. Therefore, the power source driver 610 may control an output torque of the engine, and the like. The power source drive unit 611 may adjust the engine output torque under control of the controller 170.

For example, if the power source is an electrical energy-based motor, the power source driver 611 may control the motor. The power source driver 611 may adjust a rotation speed, torque, and the like of the motor under control of the controller 170.

The transmission drive unit 612 may control the transmission.

The transmission drive unit 612 may adjust the state of the transmission. The transmission drive unit 612 may adjust the state of the transmission to drive D, reverse R, neutral N, or park P.

If the power source is the engine, the transmission drive unit 612 may adjust the engagement state of gears in the drive mode D.

The chassis drive unit 620 may control operation of a chassis device.

The chassis drive unit 620 may include a steering drive unit 621, a brake drive unit 622, and a suspension drive unit 623.

The steering drive unit 621 may perform electronic control on a steering apparatus in the vehicle 100. The steering drive unit 621 may change the travel direction of the vehicle 100.

The brake drive unit 622 may perform electronic control on a brake apparatus in the vehicle 100. For example, the brake drive unit 622 may decrease the speed of the vehicle 100 by controlling the operation of brakes disposed at wheels.

The brake drive unit 622 may control a plurality of brakes individually. The brake drive unit 622 may control braking power applied to a plurality of wheels differently.

The suspension drive unit 623 may perform electronic control on a suspension apparatus in the vehicle 100. For example, if the surface of a road is rugged, the suspension drive unit 623 may control the suspension apparatus to attenuate vibration of the vehicle 100.

The suspension drive unit 623 may control a plurality of suspensions individually.

The door/window drive unit 630 may perform electronic control on a door apparatus or a window apparatus in the vehicle 100.

The door/window drive unit 630 may include a door drive unit 631 and a window drive unit 632.

The door drive unit 631 may perform electronic control on a door apparatus in the vehicle 100. For example, the door drive unit 631 may control opening and closing of a plurality of doors in the vehicle 100. The door drive unit 631 may control opening or closing of the trunk or the tail gate. The door drive unit 631 may control opening or closing of the sunroof.

The window drive unit 632 may perform electronic control on a window apparatus in the vehicle 100. The window drive unit 632 may control opening or closing of a plurality of windows in the vehicle 100.

The safety apparatus drive unit 640 may perform electronic control on various safety apparatuses in the vehicle 100.

The safety apparatus drive unit 640 may include an airbag drive unit 641, a seatbelt drive unit 642, and a pedestrian protection device drive unit 643.

The airbag drive unit 641 may perform electronic control on an airbag apparatus in the vehicle 100. For example, the airbag drive unit 641 may control inflation of an airbag, upon sensing an emergency situation.

The seatbelt drive unit 642 may perform electronic control on a seatbelt apparatus in the vehicle 100. For example, the seatbelt drive unit 642 may control securing of passengers on the seats 110FL, 110FR, 110RL, and 110RR by means of seatbelts, upon sensing a danger.

The pedestrian protection device drive unit 643 may perform electronic control on a hood lift and a pedestrian airbag. For example, the pedestrian protection device drive unit 643 may control the hood to be lifted up and the pedestrian airbag to be inflated, upon sensing collision with a pedestrian.

The lamp drive unit 650 may perform electronic control on various lamp apparatuses in the vehicle 100.

The air conditioner drive unit 660 may perform electronic control on an air conditioner in the vehicle 100. For example, if a vehicle internal temperature is high, the air conditioner drive unit 660 may control the air conditioner to operate and supply cool air into the vehicle 100.

The vehicle driving device 600 may include a processor. Each of the units of the vehicle driving device 600 may individually include a processor.

The vehicle driving device 600 may operate under control of the controller 170.

The operation system 700 is a system that controls various operations of the vehicle 100. The operation system 700 may operate in the autonomous driving mode.

The operation system 700 may include the driving system 710, the park-out system 740, and the park-in system 750.

In some implementations, the operation system 700 may further include a new component in addition to the components described below or may not include a part of the described components.

The operation system 700 may include a processor. Each of the units of the operation system 700 may individually include a processor.

The operation system may control operation in the autonomous driving mode based on the learning. In this case, a learning mode and an operating mode based on completion of learning may be performed. Hereinafter, a method for the processor of the operation system to perform the learning mode and the operating mode will be described.

The learning mode may be performed in the manual mode described above. In the learning mode, the processor of the operation system may perform learning of a travel path of the vehicle 100 and learning of the surrounding environment.

The travel path learning may include generating map data about the path along which the vehicle 100 travels. In particular, the processor of the navigation system 700 may generate map data based on the information detected through the object detection device 300 while the vehicle 100 is traveling from a point of departure to the destination.

The surrounding environment learning may include storing and analyzing information about the surrounding environment of the vehicle 100 during travel and parking of the vehicle 100. Particularly, the processor of the operation system may store and analyze information about the surrounding environment of the vehicle 100 based on the information detected through the object detection device 300 in the parking process of the vehicle 100, for example, the location information on the parking space, the size information on the parking space, information on fixed (or non-fixed) obstacles.

The operating mode may be performed in the autonomous driving mode described above. The operating mode will be described on the assumption that the travel path learning or the surrounding environment learning is completed in the learning mode.

The operating mode may be performed in response to user input through the input unit 210, or automatically performed when the vehicle 100 reaches a travel path and a parking space which has been learned.

The operating mode may include a semi-autonomous operating mode, which partially requires the user's manipulation of the driving manipulation device 500, and a fully autonomous operating mode, which it does not require the user's manipulation of the driving manipulation device 500.

In some implementations, the processor of the operation system may control the driving system 710 in the operating mode to drive the vehicle 100 along a travel path that has been learned.

In some implementations, the processor of the operation system 700 may control the park-out system 740 in the operating mode to take the parked vehicle 100 out of a parking space which has been learned.

In some implementations, the processor of the operation system may control the park-in system 750 in the operating mode to guide the vehicle 100 at the current location to a parking space which has been learned to park the vehicle 100.

In some implementations, if the operation system 700 is implemented in software, the operation system 700 may be implemented by at least one processor, such as controller 170.

In some implementations, the operation system 700 may include at least one of the UI device 200, the object detection device 300, the communication device 400, the driving manipulation device 500, the vehicle driving device 600, the navigation system 770, the sensing unit 120, or the controller 170.

The driving system 710 may drive the vehicle 100.

The driving system 710 may drive the vehicle 100 by providing a control signal to the vehicle driving device 600 according to navigation information received from the navigation system 770.

The driving system 710 may drive the vehicle 100 by providing a control signal to the vehicle driving device 600 based on object information received from the object detection device 300.

The driving system 710 may drive the vehicle 100 by receiving a signal from an external device through the communication device 400 and providing a control signal to the vehicle driving device 600.

The driving system 710 may be a system that includes at least one of the UI device 200, the object detection device 300, the communication device 400, the driving manipulation device 500, the vehicle driving device 600, the navigation system 770, the sensing unit 120, or the controller 170, and drives the vehicle 100.

The driving system 710 may be referred to as a vehicle driving control device.

The park-out system 740 may perform park-out of the vehicle 100.

The park-out system 740 may perform park-out of the vehicle 100 by providing a control signal to the vehicle driving device 600 according to navigation information received from the navigation system 770.

The park-out system 740 may perform park-out of the vehicle 100 by providing a control signal to the vehicle driving device 600 according to object information received from the object detection device 300.

The park-out system 740 may perform park-out of the vehicle 100 by providing a control signal to the vehicle driving device 600 according to a signal received from an external device through the communication device 400.

The park-out system 740 may be a system that includes at least one of the UI device 200, the object detection device 300, the communication device 400, the driving manipulation device 500, the vehicle driving device 600, the navigation system 770, the sensing unit 120, or the controller 170 and performs park-out of the vehicle 100.

The park-out system 740 may be referred to as a vehicle park-out control device.

The park-in system 750 may perform park-in of the vehicle 100.

The park-in system 750 may perform park-in of the vehicle 100 by providing a control signal to the vehicle driving device 600 according to navigation information received from the navigation system 770.

The park-in system 750 may perform park-in of the vehicle 100 by providing a control signal to the vehicle driving device 600 according to object information received from the object detection device 300.

The park-in system 750 may perform park-in of the vehicle 100 by providing a control signal to the vehicle driving device 600 according to a signal received from an external device through the communication device 400.

The park-in system 750 may be a system that includes at least one of the UI device 200, the object detection device 300, the communication device 400, the driving manipulation device 500, the vehicle driving device 600, the navigation system 770, the sensing unit 120, or the controller 170, and performs park-in of the vehicle 100.

The park-in system 750 may be referred to as a vehicle park-in control device.

The navigation system 770 may provide navigation information. The navigation information may include at least one of map information, set destination information, route information according to setting of a destination, information about various objects on a route, lane information, or information about a current location of a vehicle.

The navigation system 770 may include a memory and a processor. The memory may store navigation information. The processor may control operation of the navigation system 770.

In some implementations, the navigation system 770 may receive information from an external device through the communication device 400 and update pre-stored information with the received information.

In some implementations, the navigation system 770 may be classified as a sub-component of the UI device 200.

The sensing unit 120 may sense the state of the vehicle. The sensing unit 120 may include an inertial navigation unit (IMU) sensor, a collision sensor, a wheel sensor, a speed sensor, an inclination sensor, a weight detection sensor, a heading sensor, a position module, a vehicle drive/reverse sensor, a battery sensor, a fuel sensor, a tier sensor, a steering sensor for rotation of the steering wheel, an in-vehicle temperature sensor, an in-vehicle humidity sensor, an ultrasonic sensor, an illuminance sensor, an acceleration pedal position sensor, and a brake pedal position sensor.

The inertial navigation unit (IMU) sensor may include one or more of an acceleration sensor, a gyro sensor, and a magnetic sensor.

The sensing unit 120 may acquire sensing signals of vehicle position information, vehicle motion information, vehicle yaw information, vehicle roll information, vehicle pitch information, vehicle collision information, vehicle heading information, vehicle location information (GPS information), vehicle angle information, vehicle speed information, vehicle acceleration information, vehicle inclination information, vehicle drive/reverse information, battery information, fuel information, wheel information, vehicle lamp information, vehicle internal temperature information, vehicle internal humidity information, a steering wheel rotation angle, a vehicle external illuminance, a pressure applied to an accelerator pedal, a pressure applied to a brake pedal, and the like.

The sensing unit 120 may further include an accelerator pedal sensor, a pressure sensor, an engine speed sensor, an Air Flow Sensor (AFS), an air temperature sensor (ATS), a water temperature sensor (WTS), a throttle position sensor (TPS), a top dead center (TDC) sensor, a crank angle sensor (CAS), and the like.

The sensing unit 120 may generate vehicle state information based on the sensing data. The vehicle state information may be generated based on data detected by various sensors included in the vehicle.

For example, the vehicle state information may include vehicle position information, vehicle speed information, vehicle inclination information, vehicle weight information, vehicle heading information, vehicle battery information, vehicle fuel information, vehicle wheel air pressure information, vehicle steering information, in-vehicle temperature information, in-vehicle humidity information, pedal position information, vehicle engine temperature information, and the like.

The interface unit 130 serves as a path to various types of external devices connected to the vehicle 100. For example, the interface unit 130 may be provided with a port connectable to a mobile terminal, and may be connected to a mobile terminal through the port. In this case, the interface unit 130 may exchange data with the mobile terminal.

The interface unit 130 may serve as a path along which electric energy is supplied to a connected mobile terminal. When the mobile terminal is electrically connected to the interface unit 130, the interface unit 130 may supply electric energy received from the power supply 190 to the mobile terminal under control of the controller 170.

The memory 140 is electrically connected to the controller 170. The memory 140 may store default data for a unit, control data for controlling the operation of the unit, and input/output data. The memory 140 may be any of various storage devices in hardware, such as Read Only Memory (ROM), Random Access Memory (RAM), Erasable and Programmable ROM (EPROM), flash drive, and hard drive. The memory 140 may store various data for overall operations of the vehicle 100, such as programs for processing or control in the controller 170.

In some implementations, the memory 140 may be integrated with the controller 170, or configured as a sub-component of the controller 170.

The controller 170 may control overall operation of the respective units in the vehicle 100. The controller 170 may be referred to as an electronic control unit (ECU).

The power supply 190 may supply power required for operation of each component under control of the controller 170. In particular, the power supply 190 may be supplied with power from a battery or the like in the vehicle.

One or more processors and the controller 170, included in the vehicle 100, may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or an electrical unit for performing other functions.

Figure 8:
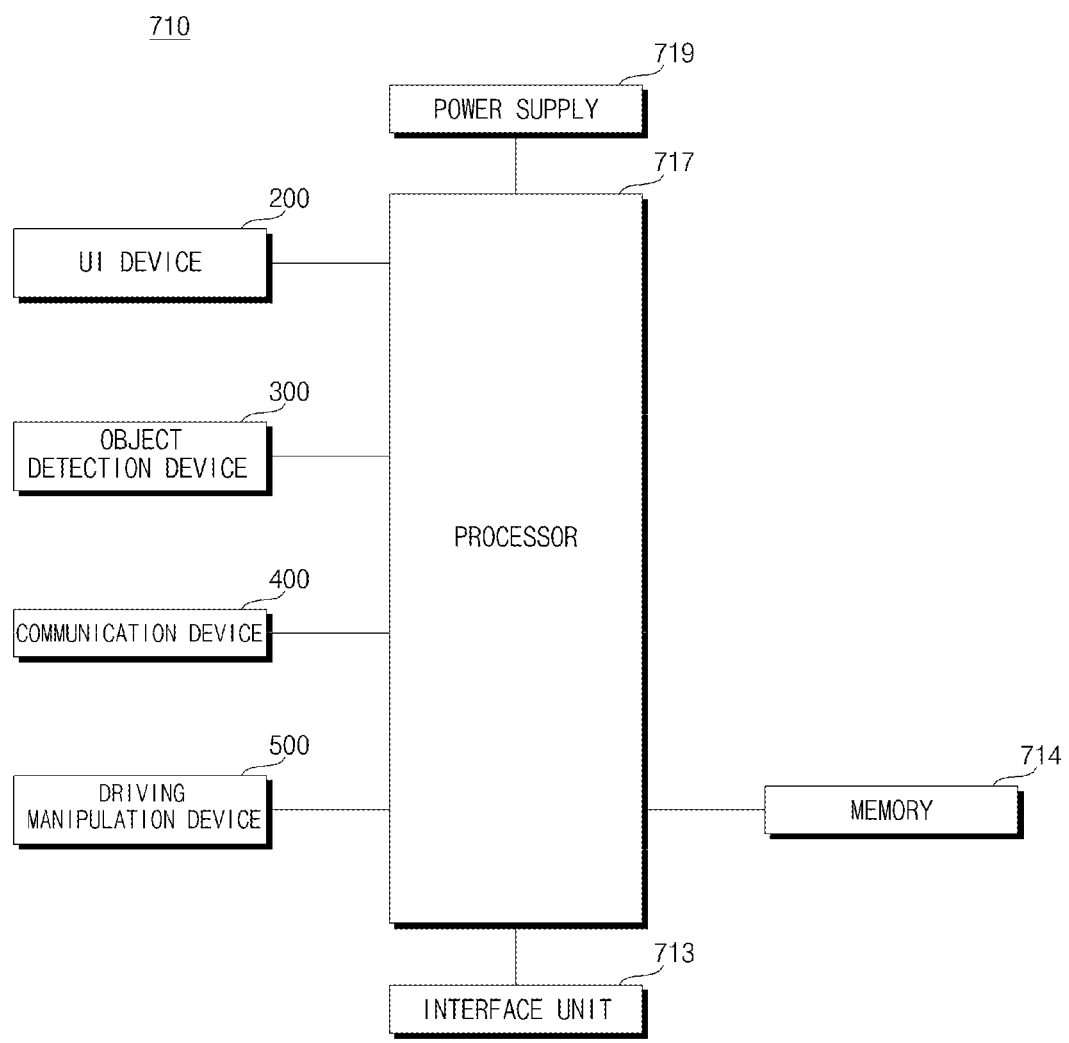
FIG. 8 is a diagram illustrating an example vehicle operation system.

FIG. 8 illustrates an example vehicle operation system.

The vehicle 100 may include an operation system 700 and a plurality of wheels.

The plurality of wheels may be driven based on a control signal generated by the operation system 700.

The vehicle operation system 700 may be referred to as a vehicle driving control apparatus.

The driving operation of the vehicle may include a driving operation of the vehicle, a park-out operation of the vehicle, and a park-in operation of the vehicle.

Referring to FIG. 8, the vehicle driving control apparatus 700 may include a UI device 200, an object detection device 300, a communication device 400, a driving manipulation device 500, an interface unit 713, a memory 714, a processor 717, and a power supply 719.

The description of the UI device 200 of FIGS. 1 to 7 may be applied to the UI device 200.

The UI device 200 may output content based on data, information or signals generated or processed by the processor 717.

For example, the UI device 200 may output a switch-to-manual-driving request signal. The UI device 200 may receive user input for switching to manual driving.

The description of the object detection device 300 of FIGS. 1 to 7 may be applied to the object detection device 300.

The object detection device 300 may include one or more sensors.

The object detection device 300 may generate information about objects outside the vehicle 100.

For example, as described above, the object detection device 300 may include a camera 310, a radar 320, a LiDAR 330, an ultrasonic sensor 340, and an IR sensor 350.

The description of the communication device 400 of FIGS. 1 to 7 may be applied to the communication device 400.

The communication device 400 may perform communication with other devices.

For example, the communication device 400 may perform communication with at least one of other vehicles or an external server.

The communication device 400 may receive information, signals, or data from at least one of other vehicles or the external server.

The description of the driving manipulation device 500 of FIGS. 1 to 7 may be applied to the driving manipulation device 500.

The driving manipulation device 500 may receive a user input for driving.

The interface unit 713 may exchange signals, information, or data with other devices included in the vehicle 100. The interface unit 713 may transmit the received signals, information, or data to the processor 717. The interface unit 713 may transmit signals, information or data generated or processed by the processor 717 to other devices included in the vehicle 100. The interface unit 713 may receive information, signals or data from other devices included in the vehicle 100.

The interface unit 713 may receive the driving situation information.

The memory 714 is electrically connected to the processor 717. The memory 714 may store default data for a unit, control data for controlling the operation of the unit, and input/output data. The memory 714 may be any of various hardware storage devices, such as ROM, RAM, EPROM, a flash drive, and a hard drive. The memory 714 may store various data for overall operation of the autonomous driving system 710, such as programs for processing or control in the processor 717.

In some implementations, the memory 714 may be integrated with the processor 717, or configured as a subcomponent of the processor 717.

The memory 714 may store driving manipulation data, which is based on the user input, and navigation data generated based on the driving operation data.

The processor 717 may be electrically connected to each of the units of the autonomous driving system 710.

The processor 717 may control the overall operation of each unit of the autonomous driving system 710.

The processor 717 may receive information on another vehicle from the other vehicle through the communication device 400.

For example, the processor 717 may receive, from the other vehicle through the communication device 400, information on whether or not the other vehicle is an autonomous vehicle.

The processor 717 may receive the driving control data of another autonomous vehicle from the other autonomous vehicle through the communication device 400.

The processor 717 may provide a control signal to at least one of the controller 170 or the vehicle driving device 600.

The processor 717 may generate a start trigger signal based on a first driving situation.

When the start trigger signal is generated, the processor 717 may store, in the memory 714, the driving manipulation data, which is based on the user input, and navigation data generated based on the driving manipulation data.

The processor 717 may generate an end trigger signal based on second driving information.

The processor 717 may terminate storing of the driving manipulation data and the navigation data.

The power supply 719 may supply power required for operation of each component under control of the processor 717. The power supply 719 may be supplied with power from a battery or the like in the vehicle.

Figure 9:
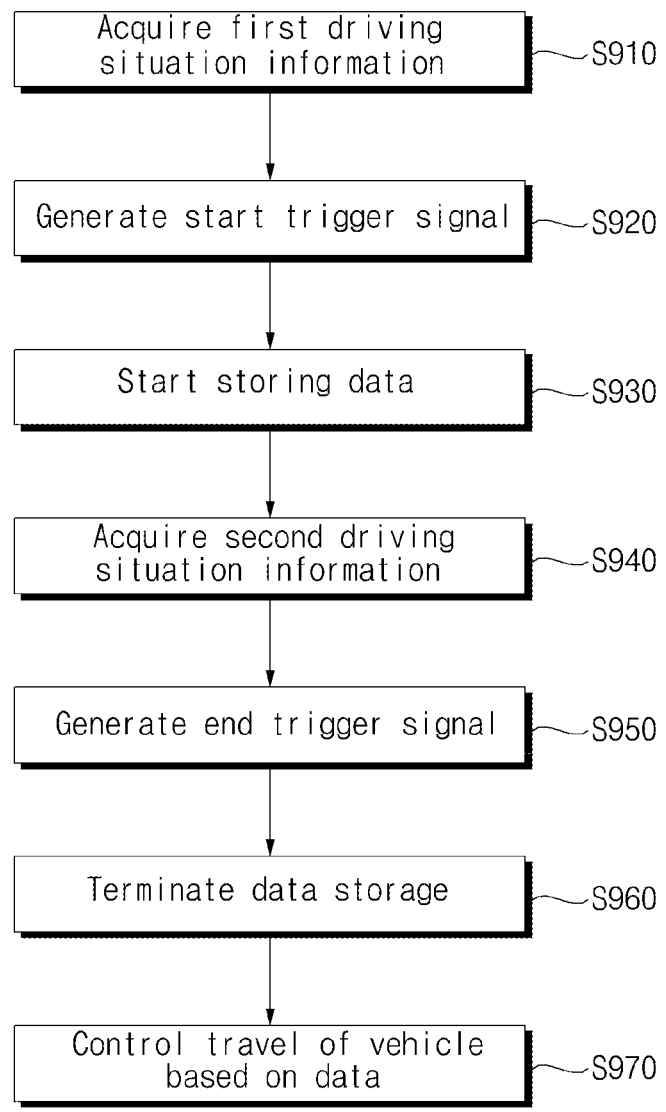
FIG. 9 is a flowchart illustrating an example method of operating a vehicle operation system.

FIG. 9 illustrates an example method of operating a vehicle operation system.

Referring to FIG. 9, the processor 717 may acquire the first driving situation information (S910). In some implementations, the first driving situation information is information about a situation in which the vehicle is placed before storing the driving manipulation data and the navigation data.

The processor 717 may continuously acquire the driving situation information during travel of the vehicle.

The processor 717 may acquire the driving situation information through the object detection device 300.

The processor 717 may acquire the driving situation information through the communication device 400.

The processor 717 may receive the driving situation information from the navigation system 770 through the interface unit 713.

The processor 717 may receive the driving situation information from the sensing unit 120 through the interface unit 713.

The processor 717 may generate a start trigger signal based on the first driving situation information (S920).

The start trigger signal may be defined as a signal for starting a data storage operation.

The step S920 of generating the start trigger may include generating, by the processor 717, a start trigger signal based on the information about objects outside the vehicle generated by the object detection device 300.

For example, step S920 of generating a start trigger may include generating, by the processor 717, the start trigger signal based on the information about the objects detected in an image acquired by the camera 310.

For example, the processor 717 may detect an object for determining at least one of entrance of the vehicle 100 into a parking lot, entry into a building, or entry into an elevator, through the camera 310. In this case, the processor 717 may generate a start trigger signal.

When the start trigger signal is generated, the processor 717 may start storing data (S930).

When the start trigger signal is generated, the processor 717 may store the driving manipulation data and the navigation data in the memory 714.

The driving manipulation data may be data generated by the driving manipulation device 500, which operates based on user input.

The driving manipulation data may include at least one of steering data, acceleration data, and brake data, which are based on user input.

The navigation data may be generated based on the driving manipulation data.

The navigation data may include at least one of map data, path data, data about objects on a path, or lane data as generated based on the driving manipulation data.

The processor 717 may acquire the second driving situation information (S940). In some implementations, the second driving situation information is information about a situation in which the vehicle is placed while storing the driving manipulation data and the navigation data.

The processor 717 may generate an end trigger signal based on the second driving situation information (S950).

The end trigger signal may be defined as a signal for terminating the data storage operation.

The processor 717 may terminate the data storage operation when the end trigger signal is generated (S960).

When the end trigger signal is generated, the processor 717 may terminate the operation of storing the driving manipulation data and the navigation data.

Steps S930 to S960 may be performed when the vehicle 100 is operated in the manual driving mode.

Thereafter, the processor 717 may control travel of the vehicle based on the driving manipulation data and the navigation data (S970).

The processor 717 may control the vehicle 100 to autonomously travel based on the driving manipulation data and the navigation data.

Figure 10:
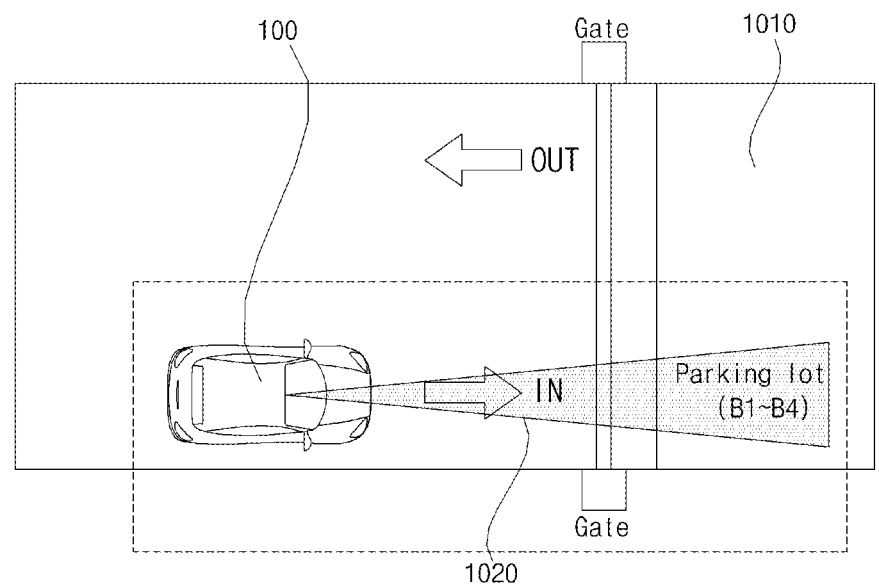
FIGS. 10 to 15 are diagrams illustrating example methods to generate a start trigger signal and an end trigger signal.
Figure 10:
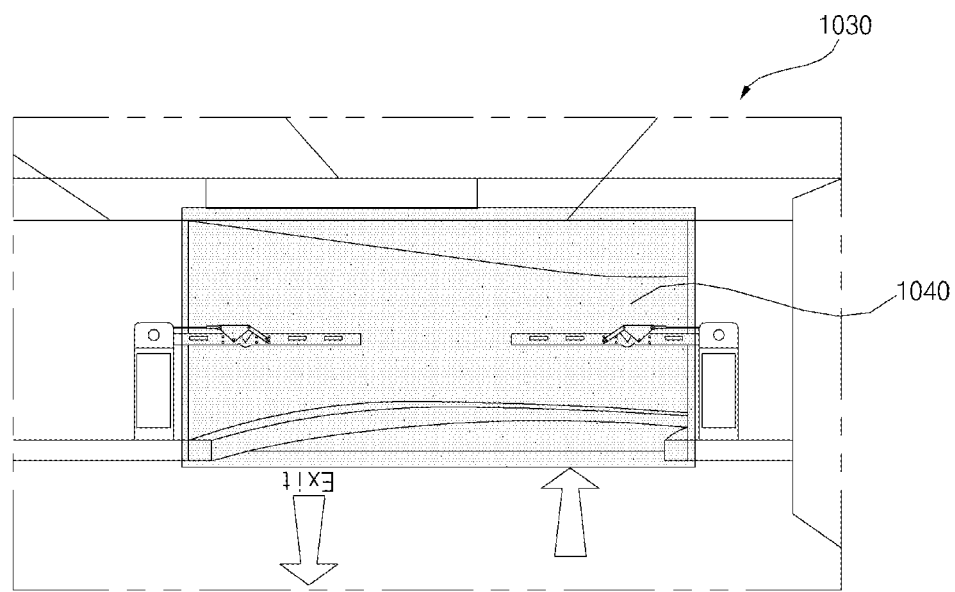

FIG. 10 illustrates an example method to generate a start trigger signal and an end trigger signal.

Referring to FIG. 10, step S920 of generating a start trigger may include generating, by the processor 717, the start trigger based on information about an object outside the vehicle 100, which is generated by the object detection device 300.

For example, step S920 of generating a start trigger may include generating, by the processor 717, the start trigger based on information about an object detected in an image acquired by the camera 310.

As illustrated in FIG. 10, when the vehicle 100 enters an indoor space 1010, the processor 717 may acquire (1020) a vehicle surroundings image 1030 through the camera 310.

The indoor space 1010 may include an indoor parking lot, a building, an elevator, and a garage.

Since the indoor space 1010 is different from a typical road, the vehicle 100 may fail to recognize the indoor space 1010 and thus perform an erroneous operation during autonomous driving. Further, the vehicle 100 may fail to secure navigation data in the indoor space 1010.

In this case, autonomous driving may be enabled in the indoor space 1010 by storing the driving manipulation data, which is based on user input, and the navigation data generated based on the driving manipulation data.

The processor 717 may detect an object 1040 in the image 1030.

The object 1040 may include a sign, a gate, a bar, and a road surface mark used to recognize entry into the indoor space 1010.

The processor 717 may generate a start trigger signal based on the information about the object 1040.

The step S950 of generating an end trigger may include generating, by the processor 717, an end trigger signal based on information about an object outside the vehicle 100, which is generated by the object detection device 300.

For example, the step S950 of generating an end trigger may include generating, by the processor 717, the end trigger signal based on information about an object detected in an image acquired by the camera 310.

When the vehicle 100 leaves an indoor space, the processor 717 may acquire a vehicle surroundings image through the camera 310.

The processor 717 may detect an object in an image.

The object may include a sign, a gate, a bar, and a road surface mark used to recognize entry into an outdoor space.

The processor 717 may generate an end trigger signal based on the information about an object.

Figure 11:
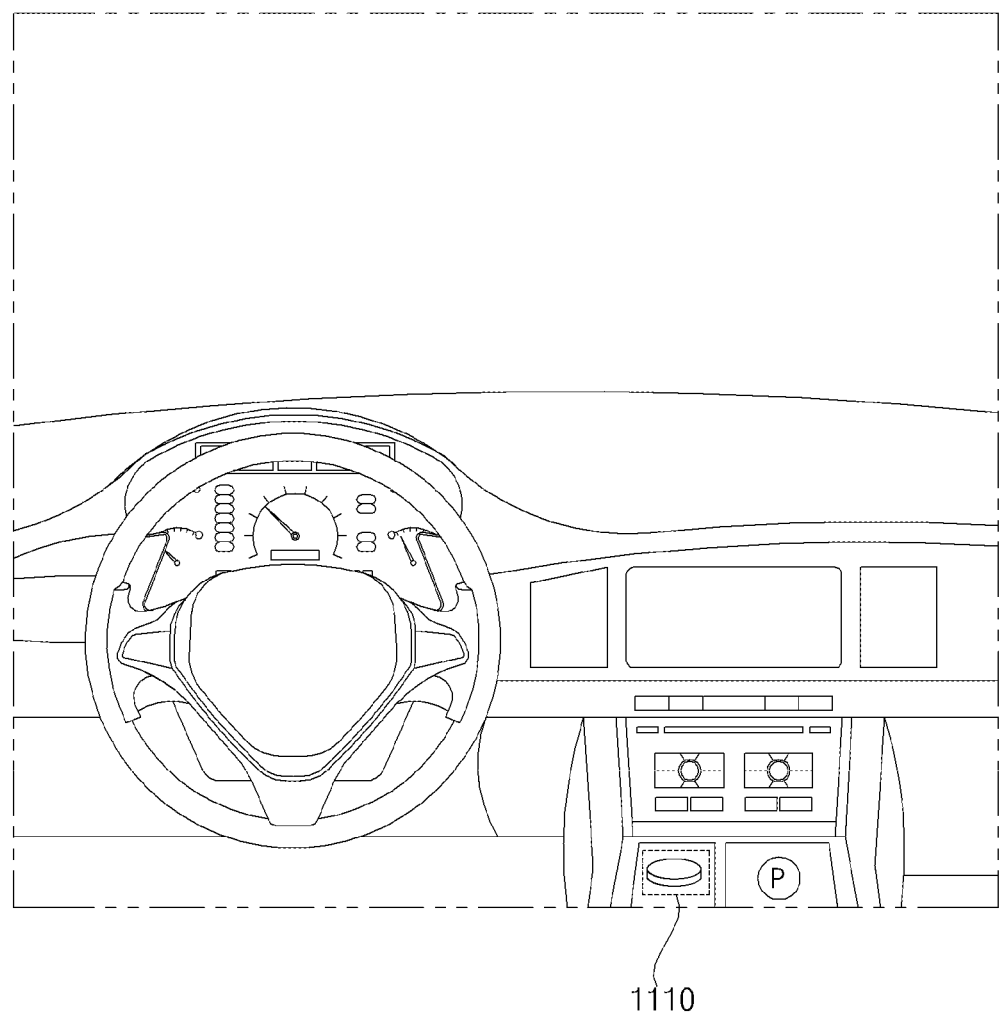

FIG. 11 illustrates another example method to generate a start trigger signal and an end trigger signal.

Referring to FIG. 11, step S920 of generating a start trigger may include generating, by the processor 717, the start trigger signal based on a signal for switching to a manual driving mode generated by the UI device 200.

The processor 717 may switch from the autonomous driving mode to the manual driving mode based on user input received through the input unit 210.

As illustrated in FIG. 11, the processor 717 may switch from the autonomous driving mode to the manual driving mode based on an input signal through a button 1110 disposed on a portion of the cockpit module.

In this case, the processor 7171 may generate a start trigger signal based on the signal for switching to the manual driving mode.

By storing the driving manipulation data and the navigation data of the user at the time of manual driving, driving can be performed in the autonomous driving mode based on the driving pattern of the user. Thereby, user discomfort during autonomous driving may be minimized.

The step S950 of generating an end trigger may include generating, by the processors 717, the end trigger signal based on a switch signal for switching to the autonomous driving mode, which is generated by the UI device 200.

The processor 717 may switch from the manual driving mode to the autonomous driving mode based on user input received through the input unit 210.

As illustrated in FIG. 11, the processor 717 may switch from the manual driving mode to the autonomous driving mode based on an input signal from the button 1110 disposed on a portion of the cockpit module.

In this case, the processor 717 may generate an end trigger signal based on the switch signal for switching to the autonomous driving mode.

Figure 12:
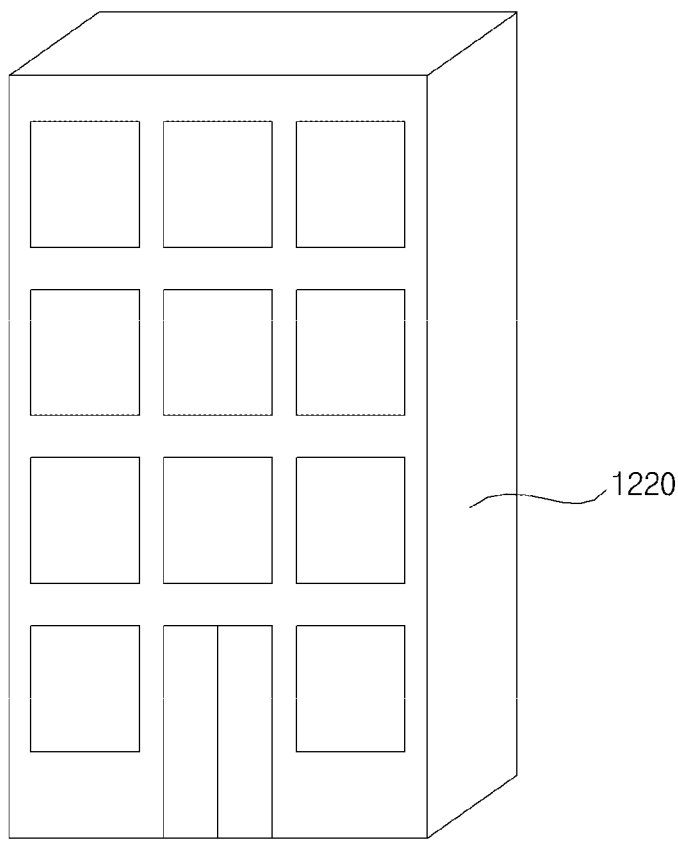
Figure 12:
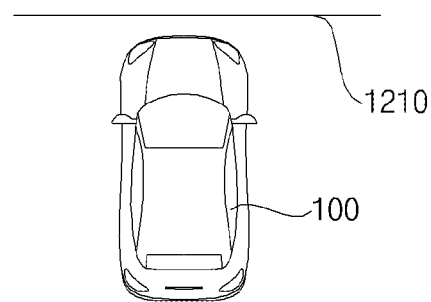
Figure 13:
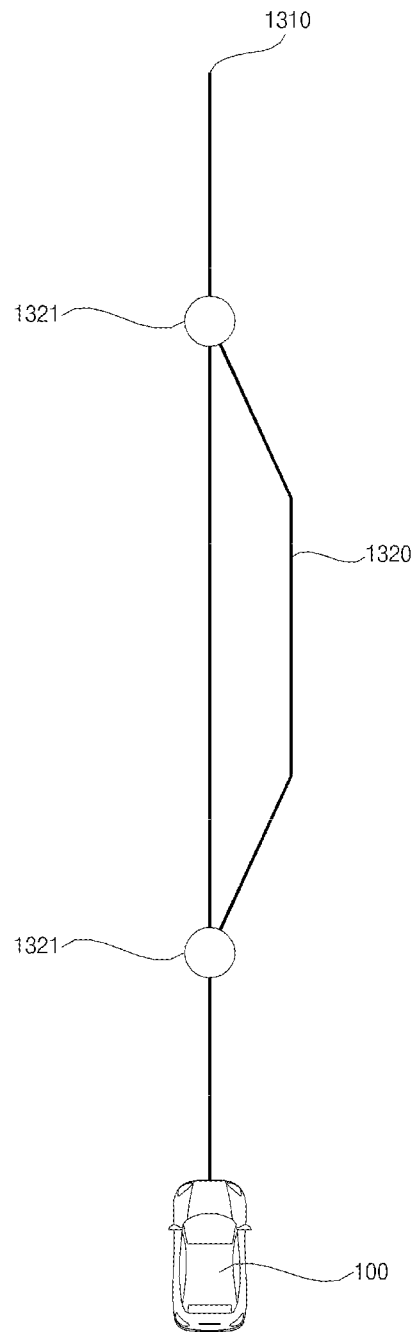

FIGS. 12 and 13 illustrate another example method to generate a start trigger signal and an end trigger signal.

Referring to FIG. 12, step S920 of generating a start trigger may include generating, by the processor 717, a start trigger signal based on the location information on the vehicle 100, which is generated by the location information unit 420.

The processor 717 may acquire location information on the vehicle 100 through the location information unit 420.

The processor 717 may generate a start trigger signal based on the location information.

For example, step S920 of generating a start trigger may include generating, by the processor 717, the start trigger signal when the vehicle 100 is located at a first point, based on stored cumulative information indicating that the vehicle has been repeatedly located at the first point a preset number of times or more by user input-based operation.

The vehicle 100 may be located at the first point 1210 a preset number of times or more by user input-based operation (manual driving).

For example, in order to travel to a user's house or company 1220, the vehicle 100 passes through a first point 1210. In this case, the vehicle 100 is located at the first point 1210 a preset number of times or more.

The processor 717 may generate a start trigger signal when the vehicle 100 is located at the first point 1210, based on stored cumulative information indicating that the vehicle has been repeatedly located at the first point 1210 a preset number of times or more by user input-based operation.

When the vehicle 100 approaches a user's house, company or a supermarket in the manual driving mode, the processor 717 may generate a start trigger signal.

In this case, the driving manipulation data and the navigation data based on user input for parking may be stored at the house, the company or the supermarket.

Thereafter, the processor 717 may drive the vehicle based on the stored data. In this case, the vehicle driving control apparatus may perform parking by reflecting a parking pattern of the user, parking prevalence, a preferred parking place, and the like.

Referring to FIG. 13, step S920 of generating a start trigger may include generating, by the processor 717, the start trigger signal when the vehicle 100 is located in a first section, based on stored cumulative information indicating that the vehicle has repeatedly traveled through the first section a preset number of times or more by user input-based operation.

An indicator 1310 indicates an autonomous driving path provided by the navigation system 770.

An indicator 1320 indicates a path that is not provided by the navigation system 770 but is learned by the user's experience.

The processor 717 may generate a start trigger signal when the vehicle 100 is located at a start point 1321 of a first section 1320, based on stored cumulative information indicating that the vehicle has repeatedly traveled through the first section 1320 a preset number of times or more by user input-based operation (manual driving).

The first section 1320 may be a section that is not stored in a database such as the navigation system 770 or an external server.

Step S950 of generating an end trigger signal may include generating, by the processor 717, the end trigger signal based on the location information on the vehicle 100, which is generated by the location information unit 420.

The processor 717 may acquire the location information on the vehicle 100 through the location information unit 420.

The processor 717 may generate an end trigger signal based on the location information.

The processor 717 may generate an end trigger signal when the vehicle 100 is located at an end point 1322 of the first section 1320.

The end point 1322 of the first section 1320 may be a start point of a section stored in the database of, for example, the navigation system 770 or an external server.

In some implementations, the processor 717 may generate a start trigger signal when the vehicle 100 is located at a start point of a section that is not stored in the database.

The processor 717 may generate an end trigger signal when the vehicle 100 is located in a section stored in the database again.

Figure 14:
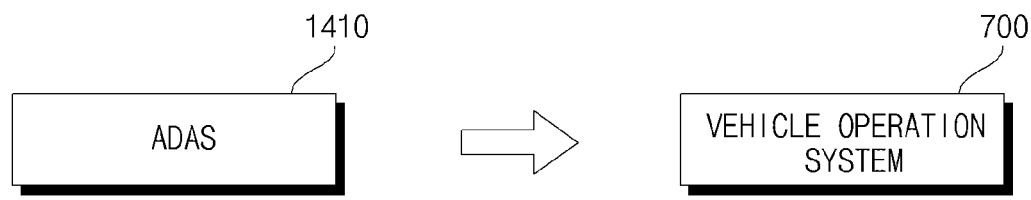

FIG. 14 illustrates another example method to generate a start trigger signal and an end trigger signal.

Referring to FIG. 14, step S920 of generating a start trigger may include generating, by the processor 717, the start trigger signal based on a turn-on signal of an advanced driver assistance system (ADAS).

The vehicle 100 may include an ADAS 1410.

The processor 717 may receive a turn-on signal from the ADAS 1410 through the interface unit 713.

The turn-on signal may be generated by the UI device 200 or may be generated in the ADAS 1410 based on the driving situation information.

The processor 717 may generate a start trigger signal based on the received turn-on signal.

Step S950 of terminating the start trigger may include generating, by the processor 717, an end trigger signal based on a turn-off signal of the ADAS.

The processor 717 may receive a turn-off signal from the ADAS 1410 through the interface unit 713.

The turn-off signal may be generated by the UI device 200 or may be generated in the ADAS 1410 based on the driving situation information.

The processor 717 may generate an end trigger signal based on the received turn-off signal.

Figure 15:
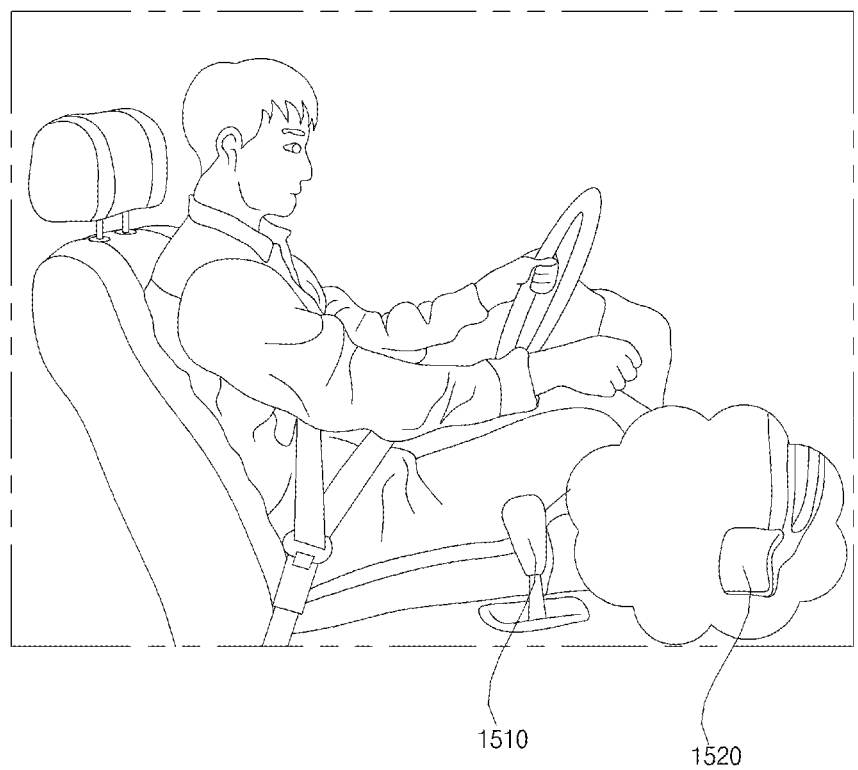
Figure 15:
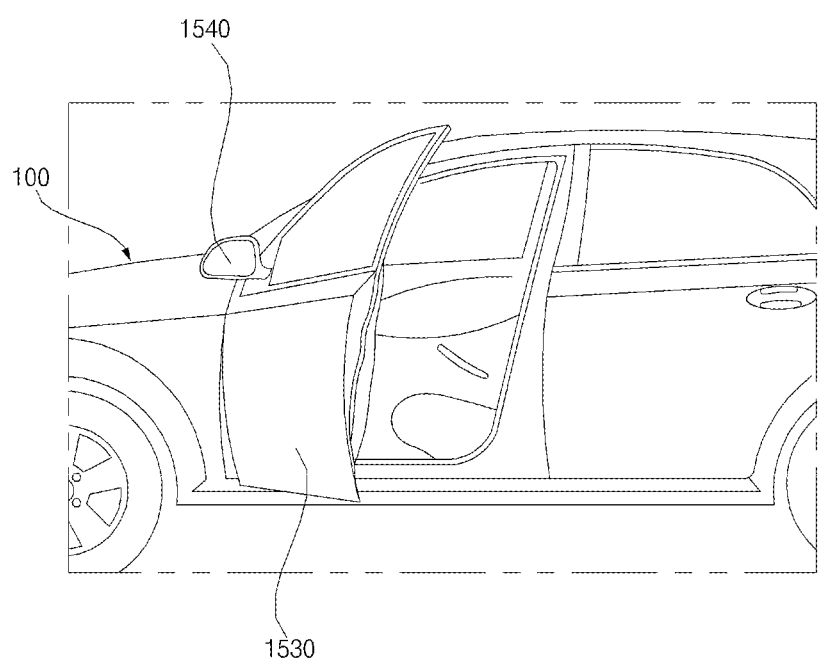

FIG. 15 illustrates another example method to generate an end trigger signal.

Referring to FIG. 15, step S950 of generating an end trigger signal may include generating, by the processor 717, the end trigger signal based on vehicle state information, which is generated by the sensing unit 120.

The sensing unit 120 may generate vehicle state information based on sensing data generated by various sensors.

The processor 717 may receive the vehicle state information from the sensing unit 120 through the interface unit 713.

The processor 717 may generate an end trigger signal based on the vehicle state information.

The vehicle state information may include information indicating the end state of driving of the vehicle 100.

For example, the vehicle state information may include position information on a shift lever 1510, vehicle turn-off information, folding information on a side mirror 1540, opening information on a door 1530, and operation information on a parking brake 1520.

Figure 16:
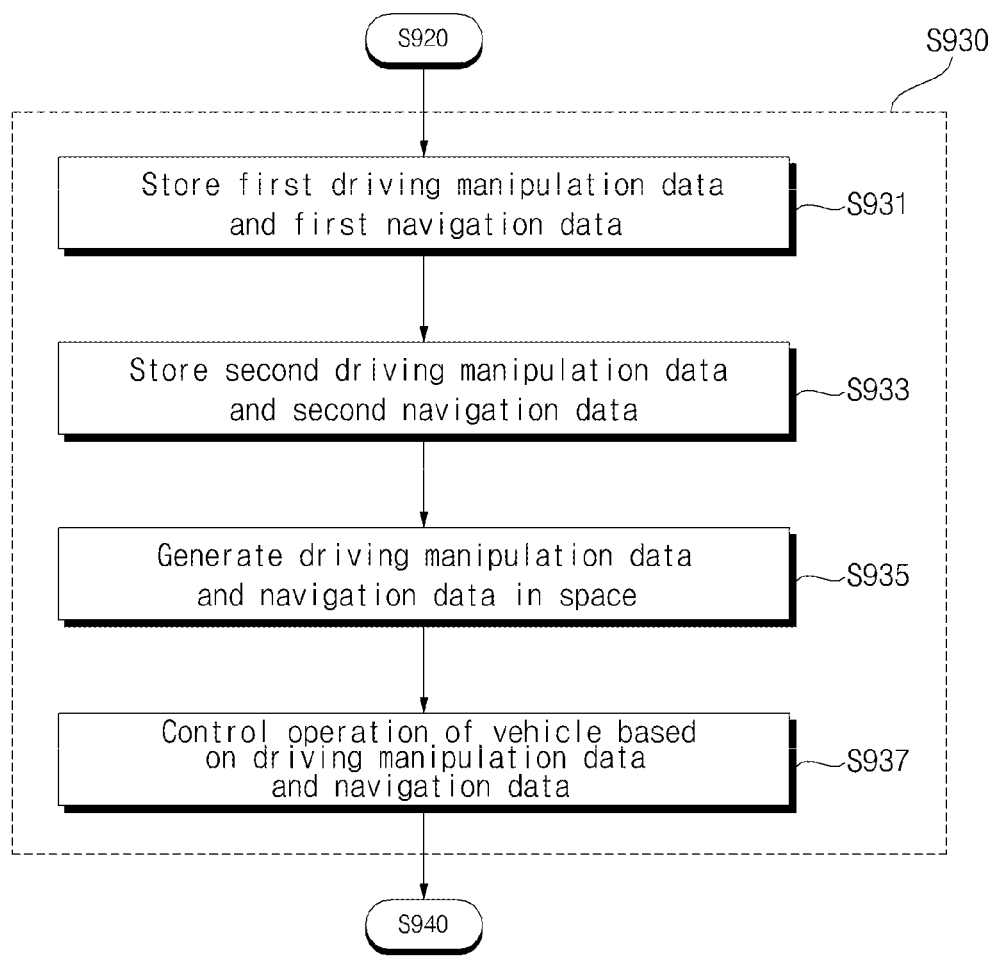
FIG. 16 is a flowchart illustrating an example method of operating a step in FIG. 9.

FIG. 16 illustrates an example method of operating the step 930 in FIG. 9.

Figure 17:
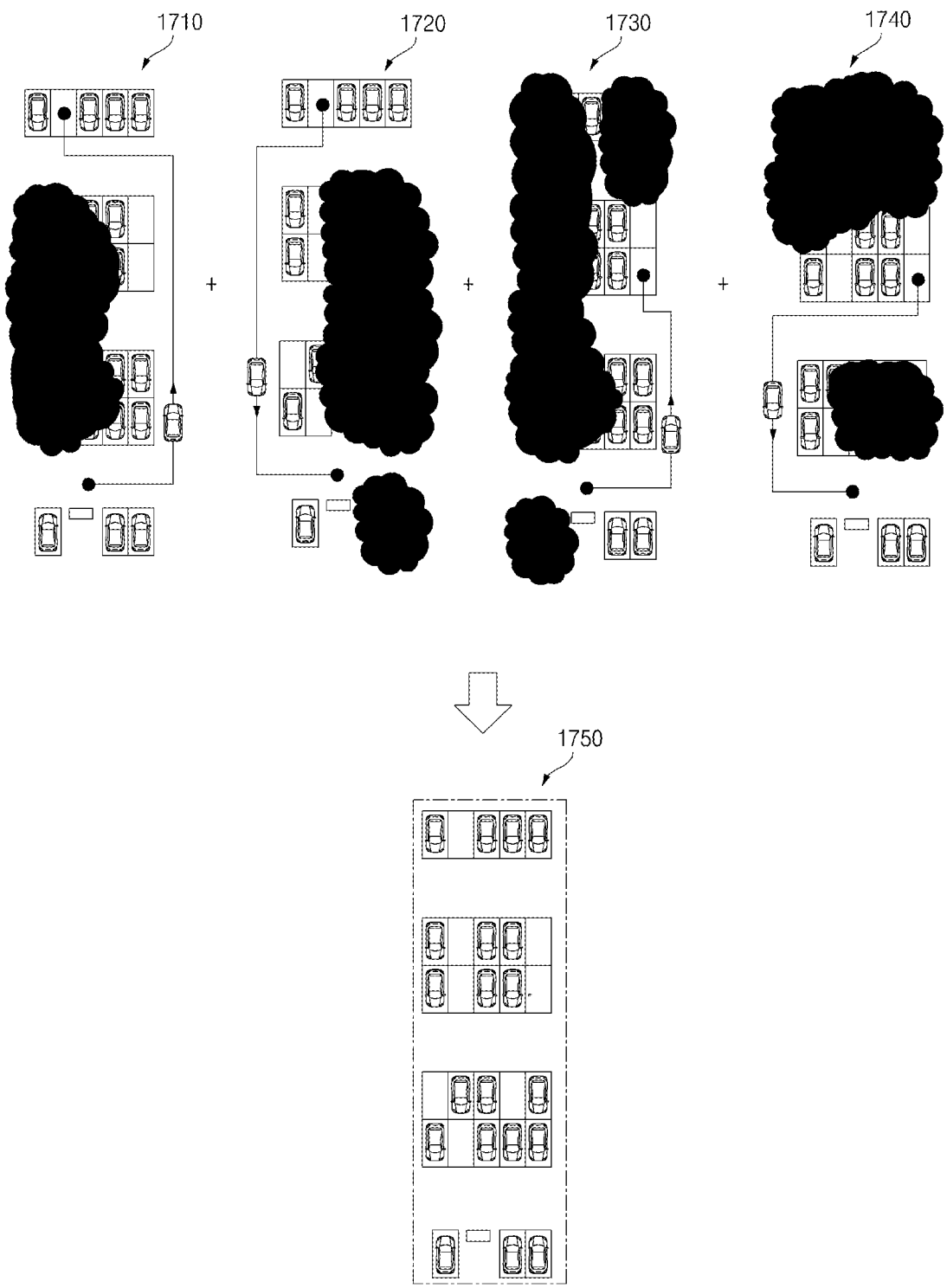
FIG. 17 is a diagram illustrating an example situation described in FIG. 16.

FIG. 17 illustrates an example situation described in FIG. 16.

Referring to FIG. 16, step S930 of storing data in the memory may include a first storing step S931, a second storing step S933, a data generating step S935, and a vehicle driving control step S937.

When the vehicle 100 is operated on the basis of user input in a first area, the processor 717 may store, in the memory 714, first driving manipulation data, which is based on user input, and first navigation data generated based on the first driving manipulation data (S931).

When the vehicle 100 is operated based on user input in a second area adjacent to the first area, the processor 717 may store, in the memory 714, second driving manipulation data, which is based on the user input, and second navigation data generated based on the second driving manipulation data (S933).

The processor 717 may generate the driving manipulation data and the navigation data in a space (S935).

The processor 717 may combine the first driving manipulation data and the second driving manipulation data.

The processor 717 may combine the first navigation data and the second navigation data.

The processor 717 may generate driving manipulation data and navigation data in a space based on the combined driving manipulation data and the combined navigation data.

Here, the space may include the first area and the second area.

The processor 717 may control operation of the vehicle 100 based on the generated driving manipulation data and the generated navigation data (S937).

The step of controlling the operation of the vehicle 100 may include controlling the operation of the vehicle 100 when the vehicle 100 is located in the first area and the second area in the space.

As illustrated in FIG. 17, an entire space 1750 may include a first area 1710, a second area 1720, a third area 1730, and a fourth area 1740.

At a first point in time, the vehicle 100 may travel in a first area 1710, based on user input through the driving manipulation device 500.

The processor 717 may store, in the memory 714, first driving manipulation data in the first area 1710 and first navigation data generated based on the first driving manipulation data.

At the second point in time, the vehicle 100 may travel in a second area 1720, based on user input through the driving manipulation device 500.

The processor 717 may store, in the memory 714, second driving manipulation data in the second area 1720 and second navigation data generated based on the second driving manipulation data.

At the third point in time, the vehicle 100 may travel in a third area 1730 based on user input through the driving manipulation device 500.

The processor 717 may store, in the memory 714, third driving manipulation data in the third area 1730 and third navigation data generated based on the third driving manipulation data.

At the fourth point in time, the vehicle 100 may travel in a fourth area 1740 based on user input through the driving manipulation device 500.

The processor 717 may store, in the memory 714, fourth driving manipulation data in the fourth area 1740 and fourth navigation data generated based on the fourth driving manipulation data.

The processor 717 may combine the data associated with the first to fourth areas 1710, 1720, 1730, and 1740 to generate data for a space 1750.

The processor 717 may generate the driving manipulation data for the space 1750 by combining the first to fourth driving manipulation data.

The processor 717 may generate navigation data for the space 1750 by combining the first to fourth navigation data.

Thereafter, when the vehicle 100 autonomously travels in the space, the processor 717 may control the vehicle 100 to be operated based on the generated driving manipulation data and the generated navigation data.

Figure 18:
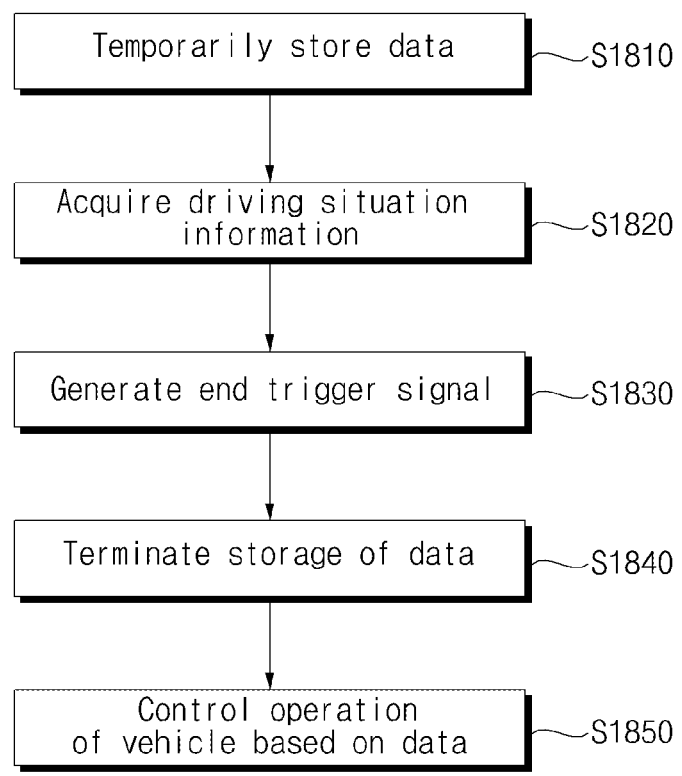
FIG. 18 is a flowchart illustrating an example method to operate a vehicle operation system.

FIG. 18 illustrates an example method to operate a vehicle operation system.

Referring to FIG. 18, the processor 717 may temporarily store, in the memory 714, the driving manipulation data, which is based on user input, and the navigation data generated based on the driving manipulation data (S1810).

The processor 717 may acquire driving situation information (S1820).

The processor 717 may acquire the driving situation information through the object detection device 300.

The processor 717 may acquire the driving situation information through the communication device 400.

The processor 717 may receive the driving situation information from the navigation system 770 through the interface unit 713.

The processor 717 may receive the driving situation information from the sensing unit 120 through the interface unit 713.

The processor 717 may generate an end trigger signal based on the driving situation information (S1830).

When the end trigger signal is generated, the processor 717 may complete storage of the driving manipulation data and the navigation data temporarily stored in the memory within a first time before generation of the end trigger signal (S1840).

Here, the first time may be determined based on the driving situation information. In some implementations, the first time may have a non-constant value, for example, by being adaptively determined.

As an example, the processor 717 may determine the first time based on the average travel speed information on the vehicle of the temporary storage step S1810. For example, when the travel speed is high, the processor 717 may determine the first time to be shorter than when the travel speed is low.

As another example, the processor 717 may determine the first time based on the location information on the vehicle 100. For example, the processor 717 may determine the first time differently for a case when the vehicle 100 is located at a position close to the user's house and a case when the vehicle 100 is located at a position close to the user's office.

As another example, the processor 717 may determine the first time based on information on objects around the vehicle 100. For example, when there are many objects around the vehicle 100, the processor 717 may determine the first time to be longer than when there are not many objects around the vehicle 100.

If there are driving manipulation data and navigation data previously stored for the same place, the processor 717 may delete the temporarily-stored data.

Thereafter, the processor 717 may control operation of the vehicle based on the driving manipulation data and the navigation data (S1850).

The processor 717 may control the vehicle 100 to autonomously travel, based on the driving manipulation data and the navigation data.

As is apparent from the above description, one or more of the following effects may be obtained.

First, since data is stored according to a start trigger signal and an end trigger signal, only necessary data can be stored and efficient data management can be performed.

Second, since the start trigger signal and the end trigger signal are generated according to the driving situation information, the necessary data may be stored without user input, thereby enhancing user convenience.

Third, since the operation of the vehicle is controlled based on the stored data, the operation control based on the sensing data may be complemented.

Effects of the implementations are not limited to the aforementioned effects, and other effects of the implementations which are not mentioned above will become apparent to those having ordinary skill in the art from the claims.

The implementations described above may be implemented as computer-readable code on a program-recorded medium. The computer-readable medium includes all kinds of recording devices in which data readable by a computer system can be stored. Examples of the computer-readable medium include a hard disk drive (HDD), solid state disk (SSD), silicon disk drive (SDD), ROM, RAM, CD-ROM, magnetic tape, floppy disk, and optical data storage. Alternatively, the implementations can be made in the form of a carrier wave (e.g., transmission over the Internet). In addition, the computer may include a processor or a controller.

What is claimed is:

1. A method for operating a vehicle comprising:
generating, by at least one processor, a start trigger signal based on first driving situation information;

in response to the start trigger signal, performing, by the at least one processor, a storage operation that stores in at least one memory (i) driving manipulation data that are generated based on user input from a user of the vehicle, and (ii) navigation data that are generated corresponding to the driving manipulation data;

generating, by the at least one processor, an end trigger signal based on second driving situation information; and in response to the end trigger signal, stopping, by the at least one processor, the storage operation that stores the driving manipulation data and the navigation data, wherein performing the storage operation that stores the driving manipulation data and the navigation data comprises:

in a state in which the vehicle is operated based on a user input in a first area, storing, by the at least one processor and in the at least one memory, (i) first driving manipulation data that are generated based on the user input, and (ii) first navigation data that are generated based on the first driving manipulation data, and in a state in which the vehicle is operated based on a user input in a second area that is adjacent to the first area, storing, by the at least one processor and in the at least one memory, (i) second driving manipulation data that are generated based on the user input, and (ii) second navigation data that are generated based on the second driving manipulation data.

2. The method according to claim 1, further comprising:
controlling, by the at least one processor, the vehicle based on the driving manipulation data and the navigation data.

3. The method according to claim 1, wherein the first driving situation information comprises information about an object outside the vehicle that is generated by an object detection device, and wherein generating the start trigger signal based on the first driving situation information comprises generating the start trigger signal based on the information about the object outside the vehicle.

4. The method according to claim 3, wherein the object detection device comprises one or more cameras, and wherein generating the start trigger signal based on the information about the object outside the vehicle comprises:

generating the start trigger signal based on information about the object being detected in one or more images detected by the one or more cameras.

5. The method according to claim 1, wherein generating the start trigger signal based on the first driving situation information comprises:

generating the start trigger signal based on a signal for switching the vehicle to a manual driving mode that is generated by a user interface device.

6. The method according to claim 1, wherein generating the start trigger signal based on the first driving situation information comprises:

generating the start trigger signal based on location information for the vehicle generated by a location information unit.

7. The method according to claim 6, wherein generating the start trigger signal based on the first driving situation information comprises:

in a state in which the location information indicates that the vehicle is located at a first location, generating the start trigger signal based on stored cumulative information indicating that a number of times that the vehicle has been previously maneuvered to the first location by a user input-based operation is greater than a threshold number.

8. The method according to claim 6, wherein generating the start trigger signal based on the first driving situation information comprises:

in a state in which the location information indicates that the vehicle is located in a first section of a route, generating the start trigger signal based on stored cumulative information indicating that a number of times that the vehicle has been previously maneuvered through the first section of the route by a user input-based operation is greater than a threshold number.

9. The method according to claim 1, wherein generating the start trigger signal based on the first driving situation information comprises:

generating the start trigger signal based on a turn-on signal for an advanced driver assistance system (ADAS) that indicates an activation of the ADAS.

10. The method according to claim 1, wherein generating the end trigger signal based on the second driving situation information comprises:

generating the end trigger signal based on information about an object outside the vehicle that is generated by an object detection device.

11. The method according to claim 10, wherein the object detection device comprises one or more cameras, and wherein generating the end trigger signal based on the information about the object outside the vehicle that is generated by the object detection device comprises:

generating the end trigger signal based on information about the object detected in one or more images acquired by the one or more cameras.

12. The method according to claim 1, wherein generating the end trigger signal based on the second driving situation information comprises:

generating the end trigger signal based on a signal for switching the vehicle to an autonomous driving mode generated by a user interface device.

13. The method according to claim 1, wherein generating the end trigger signal based on the second driving situation information comprises:

generating the end trigger signal based on location information for the vehicle generated by a location information unit.

14. The method according to claim 1, wherein generating the end trigger signal based on the second driving situation information comprises:

generating the end trigger signal based on a turn-off signal for an advanced driver assistance system (ADAS) that indicates a deactivation of the ADAS.

15. The method according to claim 1, wherein generating the end trigger comprises:

generating the end trigger signal based on vehicle state information generated by a sensing unit.

16. The method according to claim 15, wherein the vehicle state information comprises at least one of:

position information of a shift lever of the vehicle, turn-off information of the vehicle, folding information of a side mirror of the vehicle, opening information of a door of the vehicle, or operation information of a parking brake of the vehicle.

17. The method according to claim 1, further comprising:
combining, by the at least one processor, the first driving manipulation data and the second driving manipulation data to generate the driving manipulation data for an area that includes the first area and the second area; and combining, by the at least one processor, the first navigation data and the second navigation data to generate the navigation data for the area that includes the first area and the second area.

18. The method according to claim 17, further comprising:

determining whether the vehicle is located in the area that includes the first area and the second area; and based on a determination that the vehicle is located in the area that includes the first area and the second area, controlling, by the at least one processor, the vehicle using the driving manipulation data and the navigation data for the area that includes the first area and the second area.

19. The method according to claim 1, wherein:

the first driving situation information comprises information about a situation of the vehicle before starting the storage operation of the driving manipulation data and the navigation data, and the second driving situation information comprises information about a situation of the vehicle during the storage operation of the driving manipulation data and the navigation data.

20. An apparatus for operating a vehicle, the apparatus comprising:

at least one memory; and at least one processor that is configured to:

generate a start trigger signal based on first driving situation information, in response to the start trigger signal, perform a storage operation that stores, in the at least one memory, (i) driving manipulation data that are generated based on user input from a user of the vehicle, and (ii) navigation data that are generated corresponding to the driving manipulation data, generate an end trigger signal based on second driving situation information, in response to the end trigger signal, stop the storage operation that stores the driving manipulation data and the navigation data, in a state in which the vehicle is operated based on a user input in a first area, store, in the at least one memory, (i) first driving manipulation data that are generated based on the user input, and (ii) first navigation data that are generated based on the first driving manipulation data, and in a state in which the vehicle is operated based on a user input in a second area that is adjacent to the first area, store, in the at least one memory, (i) second driving manipulation data that are generated based on the user input, and (ii) second navigation data that are generated based on the second driving manipulation data.

21. A method for operating a vehicle, the method comprising:

performing a storage operation that temporarily stores, by at least one processor and in at least one memory, (i) driving manipulation data that are generated based on user input from a user of the vehicle, and (ii) navigation data that are generated based on the driving manipulation data;

generating, by the at least one processor, an end trigger signal based on driving situation information of the vehicle;

in response to the end trigger signal, completing, by the at least one processor, the storage operation to temporarily store at least a portion of the driving manipulation data and at least a portion of the navigation data that were accumulated during a first period of time immediately preceding the generating of the end trigger signal;

controlling, by the at least one processor, the vehicle based on the at least a portion of the driving manipulation data and the at least a portion of the navigation data that were accumulated during the first period of time;

determining the first period of time based on the driving situation information including an average speed of the vehicle during the storage operation; and decreasing the first period of time based on an increase of the average speed of the vehicle.

* * * * *